United States Patent
Tang et al.

(10) Patent No.: US 12,335,922 B2
(45) Date of Patent: Jun. 17, 2025

(54) WIRELESS COMMUNICATION DEVICE AND WIRELESS COMMUNICATION METHOD

(71) Applicant: SONY GROUP CORPORATION, Tokyo (JP)

(72) Inventors: Yifu Tang, Tokyo (JP); Hiromasa Uchiyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 374 days.

(21) Appl. No.: 17/755,424

(22) PCT Filed: Oct. 30, 2020

(86) PCT No.: PCT/JP2020/040978
§ 371 (c)(1),
(2) Date: Apr. 28, 2022

(87) PCT Pub. No.: WO2021/090784
PCT Pub. Date: May 14, 2021

(65) Prior Publication Data
US 2022/0408413 A1    Dec. 22, 2022

(30) Foreign Application Priority Data

Nov. 7, 2019 (JP) .................. 2019-202687

(51) Int. Cl.
*H04W 72/02* (2009.01)
*H04L 1/00* (2006.01)
(Continued)

(52) U.S. Cl.
CPC .......... *H04W 72/02* (2013.01); *H04L 1/0003* (2013.01); *H04W 72/56* (2023.01); *H04W 92/18* (2013.01)

(58) Field of Classification Search
CPC ..... H04W 72/02; H04W 72/56; H04W 92/18; H04L 1/0003
See application file for complete search history.

(56) References Cited

U.S. PATENT DOCUMENTS

2019/0166625 A1    5/2019  Nam
2020/0337038 A1*  10/2020  Takeda .................. H04L 1/00
(Continued)

FOREIGN PATENT DOCUMENTS

JP        2018-191104 A      11/2018
WO    WO-2018052241 A1 *    3/2018  .......... H04L 5/0037
(Continued)

OTHER PUBLICATIONS

"Considerations on sidelink QoS management", Spreadtrum Communications, 3GPP TSG RAN WG1, 96th bis Meeting, Xi'an, China, R1-1904791, Apr. 8-12, 2019, 03 pages.
(Continued)

*Primary Examiner* — Deepa Belur
(74) *Attorney, Agent, or Firm* — CHIP LAW GROUP

(57) ABSTRACT

There is provided a wireless communication device which includes a control unit. In a case where a resource selected for use in packet transmission is preempted by another wireless communication device in sidelink communication, the control unit adjusts a transmission parameter and transmits the packet. Further, the adjustment of the transmission parameter includes conversion of a modulation method to a high-efficiency method.

18 Claims, 25 Drawing Sheets

(51) Int. Cl.
  *H04W 72/56*   (2023.01)
  *H04W 92/18*   (2009.01)

(56)  References Cited

U.S. PATENT DOCUMENTS

| 2021/0250118 A1* | 8/2021 | Roth-Mandutz | ...... H04W 76/14 |
| 2022/0022165 A1* | 1/2022 | Zhang | ................... H04W 72/51 |
| 2022/0394560 A1* | 12/2022 | Yu | ..................... H04W 72/0446 |
| 2022/0400490 A1* | 12/2022 | Ji | ..................... H04W 72/0453 |

FOREIGN PATENT DOCUMENTS

| WO | WO-2019170084 A1 * | 9/2019 | ........... H04L 5/0048 |
| WO | WO-2020142990 A1 * | 7/2020 | ............ H04W 28/26 |

OTHER PUBLICATIONS

"Discussion on mode 2 resource allocation mechanism", Vivo, 3GPP TSG RAN WG1, 98th bis Meeting, Chongqing, China, R1-1911420, Oct. 14-20, 2019, 14 pages.

"Considerations on V2V priority handling", CATT, 3GPP TSG RAN WG1, 85th Meeting, Nanjing, China, R1-164207, May 23-27, 2016, 03 pages.

International Search Report and Written Opinion of PCT Application No. PCT/JP2020/040978, issued on Jan. 26, 2021, 07 pages of ISRWO.

\* cited by examiner

DRONE BASE STATION

TERMINAL BASE STATION

 
 

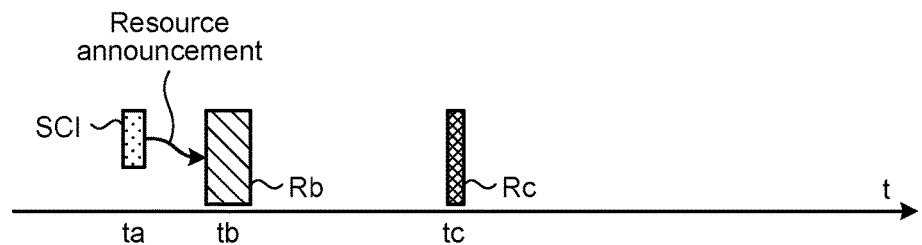
FIG. 30A
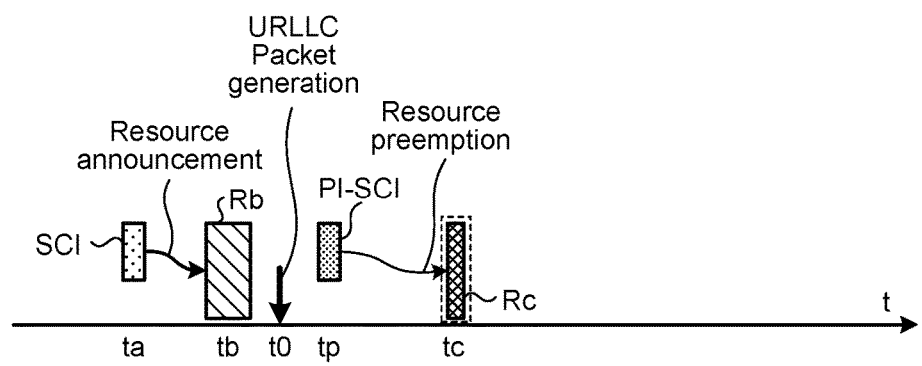
FIG. 30B
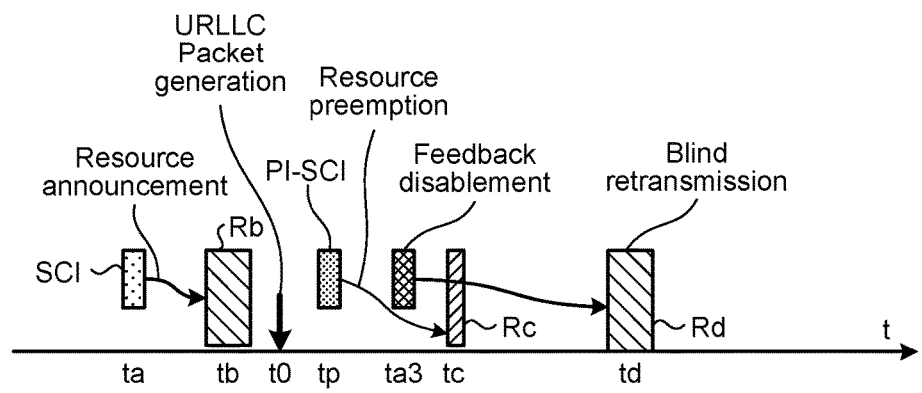
FIG. 30C
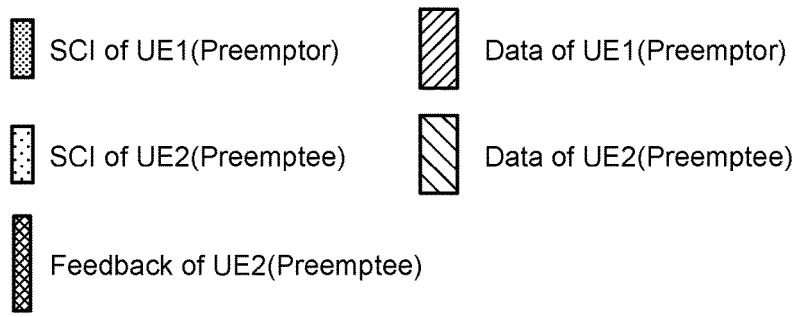

WIRELESS COMMUNICATION DEVICE AND WIRELESS COMMUNICATION METHOD

CROSS REFERENCE TO RELATED APPLICATIONS

This application is a U.S. National Phase of International Patent Application No. PCT/JP2020/040978 filed on Oct. 30, 2020, which claims priority benefit of Japanese Patent Application No. JP 2019-202687 filed in the Japan Patent Office on Nov. 7, 2019. Each of the above-referenced applications is hereby incorporated herein by reference in its entirety.

FIELD

The present disclosure relates to a wireless communication device and a wireless communication method.

BACKGROUND

Wireless access methods and wireless networks for cellular mobile communication (hereinafter, also referred to as "Long Term Evolution (LTE)", "LTE-Advanced (LTE-A)", "LTE-Advanced Pro (LTE-A Pro)", "5G (5th generation)", "New Radio (NR)", "New Radio Access Technology (NRAT)", "Evolved Universal Terrestrial Radio Access (EUTRA)", or "Further EUTRA (FEUTRA)") are under review in the 3rd Generation Partnership Project (3GPP). Note that, in the following description, LTE includes LTE-A, LTE-A Pro, and EUTRA, and NR includes NRAT and FEUTRA. In LTE and NR, a base station device (base station) is also referred to as an evolved NodeB (eNodeB) in LTE and a gNodeB in NR, and a terminal device (mobile station, mobile station device, and terminal) is also referred to as user equipment (UE). LTE and NR are cellular communication systems in which a plurality of areas covered by a base station device is arranged in a cell form. A single base station device may manage a plurality of cells.

NR is a radio access technology (RAT) different from LTE as a next-generation wireless access method for LTE. NR is an access technology that can cope with various use cases including enhanced mobile broadband (eMBB), massive machine type communications (mMTC), and ultra reliable and low latency communications (URLLC). NR is studied aiming at a technical framework corresponding to use scenarios, request conditions, arrangement scenarios, and the like in those use cases.

In NR, a plurality of transmission methods is studied. For example, the transmission methods include grant-based transmission (transmission with grant) and grant-free transmission (transmission without grant). The presence or absence of grant corresponds to the presence or absence of a predetermined procedure for collision prevention. In the case of the grand-based communication, transmission is performed after a predetermined procedure for collision prevention is performed, and in the case of the grant-free communication, transmission is performed without performing a predetermined procedure for collision prevention. Here, the predetermined procedure for collision prevention includes resource allocation by the base station and/or predetermined sensing for collision prevention. In the grant-free transmission, since a predetermined procedure for collision prevention can be omitted, transmission with a low latency can be performed as compared with the grant-based transmission. Regarding grant-free transmission, for example, Patent Literature 1 below discloses a technology regarding grant-free transmission in uplink.

On the other hand, a technology related to a sidelink which is a communication link for direct communication between terminals has also been actively studied in recent years. In particular, in recent years, expectations for in-vehicle communication (V2X communication) have increased in order to realize future automated driving. V2X communication is an abbreviation of vehicle to X communication, and is a system in which a vehicle and "something" communicate with each other. Examples of "something" here include a vehicle, an infrastructure, a network, a pedestrian, and the like (V2V, V2I, V2N, and V2P). As wireless communication for vehicles, 802.11p-based dedicated short range communication (DSRC) has been mainly developed so far, but in recent years, "LTE-based V2X" which is LTE-based in-vehicle communication has been standardized. In the LTE-based V2X communication, exchange of basic safety messages and the like is supported.

CITATION LIST

Patent Literature

Patent Literature 1: JP 2018-191104 A

SUMMARY

Technical Problem

In addition to the grant-free transmission in uplink studied in Patent Literature 1, grant-free transmission in sidelink is also assumed. The grant-free transmission in sidelink can be used, for example, for transmitting urgent information such as information indicating sudden braking of an automated driving vehicle or an alarm in factory automation with low latency and high reliability.

However, since a predetermined procedure for collision prevention is omitted in the grant-free transmission, the packet transmitted without grant may collide with other packets transmitted and received between other terminals. Considering that communication in the sidelink may not undergo centralized control by a base station or the like, a similar collision may occur in grant-based transmission in sidelink. Therefore, there is a demand for a mechanism for avoiding packet collision in sidelink communication.

Therefore, the present disclosure provides a mechanism for reducing collision of packets transmitted in the sidelink.

Solution to Problem

According to the present disclosure, a wireless communication device is provided. The wireless communication device includes a control unit. In a case where a resource selected for use in packet transmission is preempted by another wireless communication device in sidelink communication, the control unit adjusts a transmission parameter and transmits the packet.

BRIEF DESCRIPTION OF DRAWINGS

FIGS. 30A, 30B, and 30C are diagrams for explaining another example of feedback transmission processing by the second terminal device according to the present embodiment.

DESCRIPTION OF EMBODIMENTS

Figure 1:
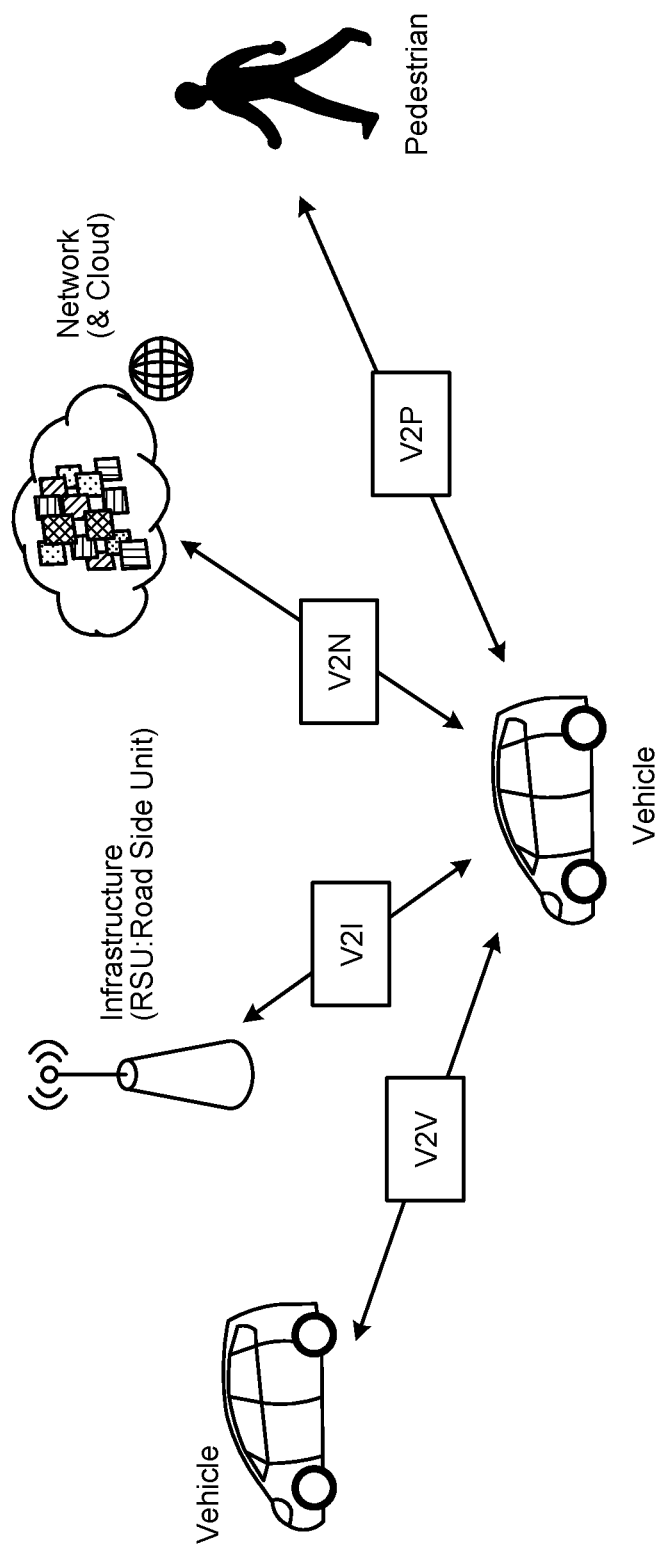
FIG. 1 is a diagram illustrating an outline of V2X communication.

Hereinafter, embodiments of the present disclosure will be described in detail with reference to the drawings. In each of the following embodiments, the same parts are denoted by the same reference numerals, and redundant description will be omitted.

The present disclosure will be described according to the following item order.

1. Introduction
  1.1. V2X communication
  1.2. Extension example of sidelink communication
  1.3. Sidelink resource allocation method
2. Outline of proposed technology
  2.1. System configuration example
  2.2. technical problems
  2.3. Outline of proposed technology
3. Configuration example
  3.1. Configuration example of base station 100
  3.2. Configuration example of first terminal device 200P
  3.3. Configuration example of second terminal device 200E
4. Technical features
  4.1. Preemption target
  4.2. Preemption processing by first terminal device 200P
  4.3. Packet transmission process by second terminal device 200E
5. Modification
  5.1. Modification 1
  5.2. Modification 2
6. Summary

1. INTRODUCTION

<1.1. V2X Communication>

An overview of V2X communication will be described below. V2X communication is an abbreviation of vehicle to X communication, and is a system in which a vehicle and "something" communicate with each other. For example, FIG. 1 is a diagram illustrating an outline of V2X communication. Examples of "something" here include a vehicle, an infrastructure, a network, a pedestrian, and the like as illustrated in FIG. 1 (V2V, V2I, V2N, and V2P).

(Overall Image of V2X Communication)

Figure 2:
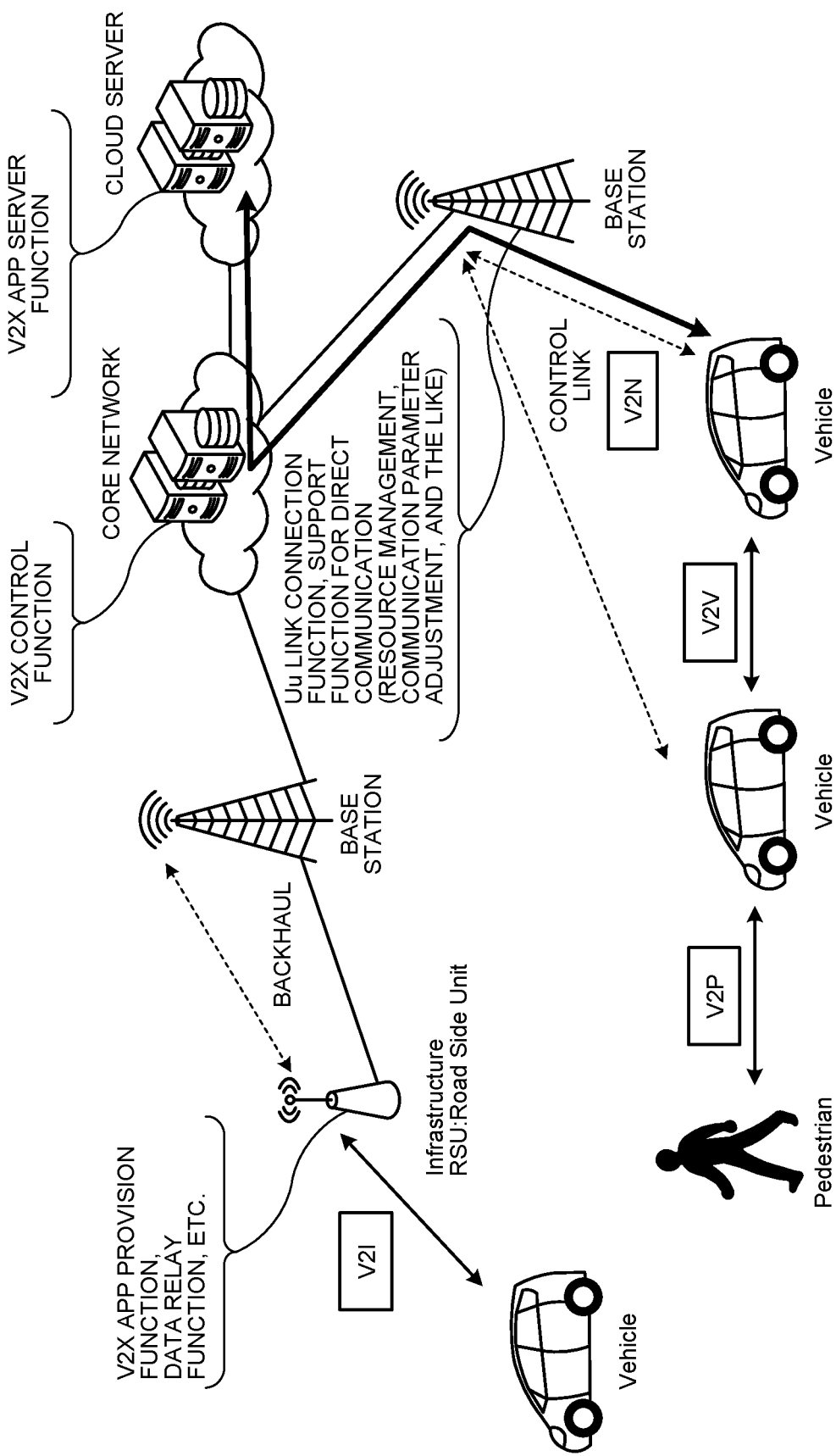
FIG. 2 is an explanatory diagram for explaining an example of an overall image of V2X communication.

FIG. 2 is an explanatory diagram for describing an example of an overall image of V2X communication. In the example illustrated in FIG. 2, an application server (APP server) of V2X is held as a cloud server, and the application server controls V2X communication on the core network side. The base station performs communication control of direct communication such as V2V communication or V2P communication while performing Uu link communication with the terminal device. In addition to the base station, a road side unit (RSU) is arranged as an infrastructure of a road shoulder. As the RSU, two RSUs are conceivable: a base station type RSU and a UE type RSU. In the RSU, provision of a V2X application (V2X APP) and support of data relay and the like are performed.

(Use Case of V2X Communication)

Figure 3:
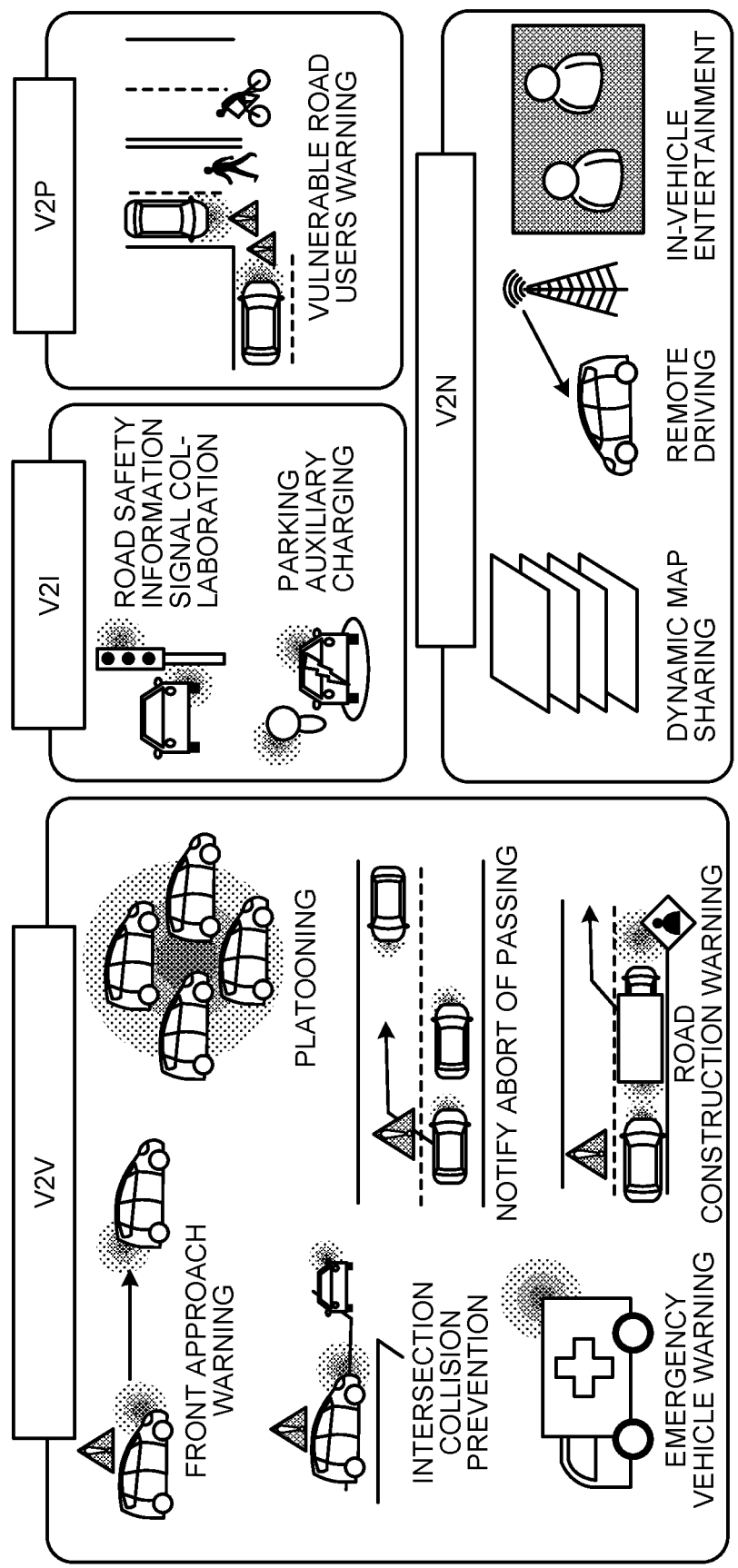
FIG. 3 is a diagram illustrating an example of a use case of V2X communication.

As wireless communication for automobiles, 802.11p-based dedicated short range communication (DSRC) has been mainly developed so far, but in recent years, "LTE-based V2X (LTE-based V2X communication)" which is LTE-based in-vehicle communication has been standardized. In the LTE-based V2X communication, exchange of basic safety messages and the like is supported. Meanwhile, in order to further improve V2X communication, NR V2X communication using 5G technology (New Radio (NR)) has been studied in recent years. For example, FIG. 3 is a diagram illustrating an example of a use case of V2X communication.

In the NR V2X communication, a new use case that requires high reliability, low latency, high-speed communication, and high capacity, which has been difficult to support in the LTE-based V2X, is supported. As a specific example, among the examples illustrated in FIG. 3, for example, provision of a dynamic map, remote driving, and the like can be mentioned. In addition to this, sensor data sharing in which sensor data is exchanged between vehicles and between road and vehicles, and a platooning use case for platooning can be mentioned. Such use cases and requirements of NR V2X communication are defined in 3GPP TR22.886. For reference, an outline of an example of a use case will be described below.

(1) Vehicles Platooning

This is a use case of platooning in which a plurality of vehicles form a platoon and travel in the same direction, and information for controlling platooning is exchanged between a vehicle that leads platooning and another vehicle. By exchanging these pieces of information, for example, it is possible to further reduce the inter-vehicle distance in platooning.

(2) Extended Sensors

This is a use case in which sensor-related information (raw data before data processing and data after processing) can be exchanged between vehicles and the like. Sensor information is gathered through local sensors, live video images (for example, live video images between surrounding vehicles, RSUs, and pedestrians), V2X application servers, and the like. By exchanging these pieces of information, the vehicle can obtain information that cannot be obtained by its own sensor information, and can recognize a wider range of environment. In the present use case, since it is necessary to exchange a lot of information, a high data rate is required for communication.

(3) Advanced Driving

This is a use case that enables semi-automated traveling and fully automated traveling. In the present use case, the RSU shares the recognition information obtained from its own sensor or the like with the surrounding vehicles, so that each vehicle can adjust the trajectory and operation while synchronizing and coordinating with other vehicles. Each vehicle can share an intention of driving with a surrounding vehicle.

(4) Remote Driving

This is a use case in which a remote operator or a V2X application performs remote control. The remote control is used in a case where another person drives instead of a person who is difficult to drive, an operation of a vehicle in a dangerous region, or the like. It is also possible to apply, for example, cloud computing based operation to public transportation in which a route and a traveling road are determined to some extent. In the present use case, high reliability and low transmission delay are required for communication.

(Physical Layer Enhancement)

Further enhancement of the physical layer from LTE V2X is required to achieve the above requirements. Examples of the target link include a Uu link and a PC5 link (sidelink). The Uu link is a link between an infrastructure such as a base station or a road side unit (RSU) and a terminal device. The PC5 link (sidelink) is a link between terminal devices. The main enhancement points are shown below.

Examples of the enhancement include the following.
Channel format
Sidelink feedback communication
Sidelink resource allocation method
Vehicle position information estimation technology
Inter-terminal relay communication
Support for unicast communication and multicast communication
Multicarrier communication, carrier aggregation
MIMO/beamforming
High frequency support (for example, 6 GHz or more) . . . etc.

Examples of the channel format include flexible numerology, short transmission time interval (TTI), multi-antenna support, Waveform, and the like. Examples of the sidelink feedback communication include HARQ and channel status information (CSI).

(V2X Operation Scenario)

An example of a communication operation scenario of V2X will be described below. In the V2N communication, only DL/UL communication is performed between the base station and the terminal device and is simple. On the other hand, in V2V communication, various communication paths can be considered. Hereinafter, each scenario will be described mainly focusing on an example of V2V communication, but a similar communication operation can be applied to V2P and V2I. In V2P and V2I, the communication destination is a pedestrian or an RSU.

Figure 4:
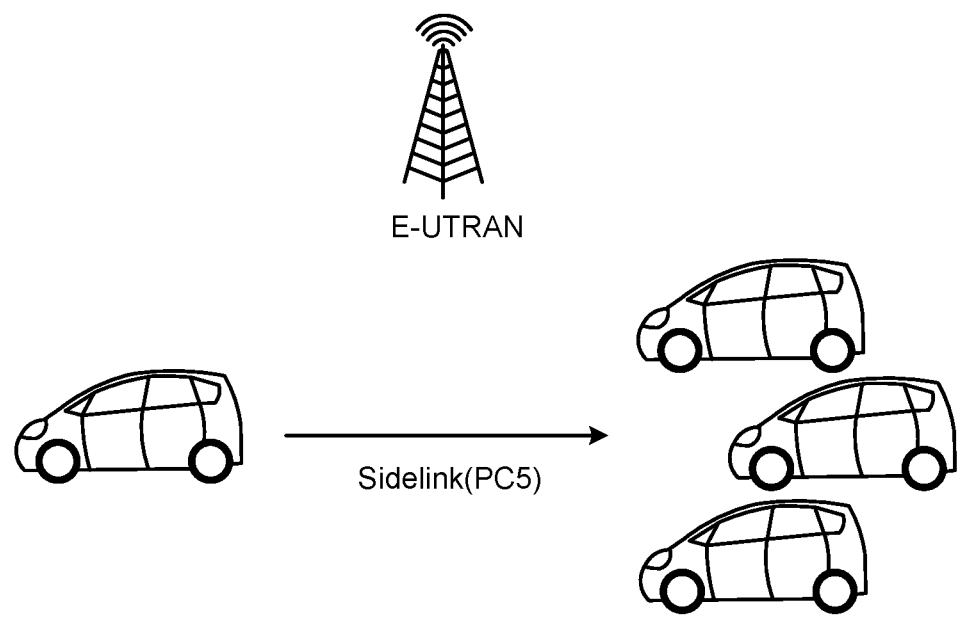
FIG. 4 is a diagram for explaining an example of a V2X operation scenario.
Figure 5:
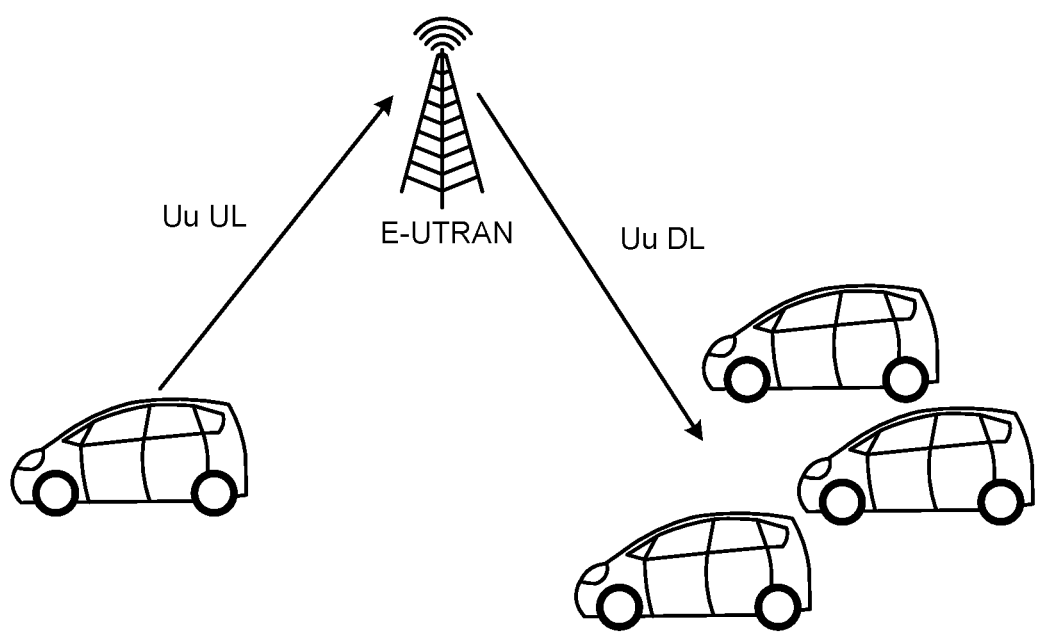
FIG. 5 is a diagram for explaining an example of a V2X operation scenario.
Figure 6:
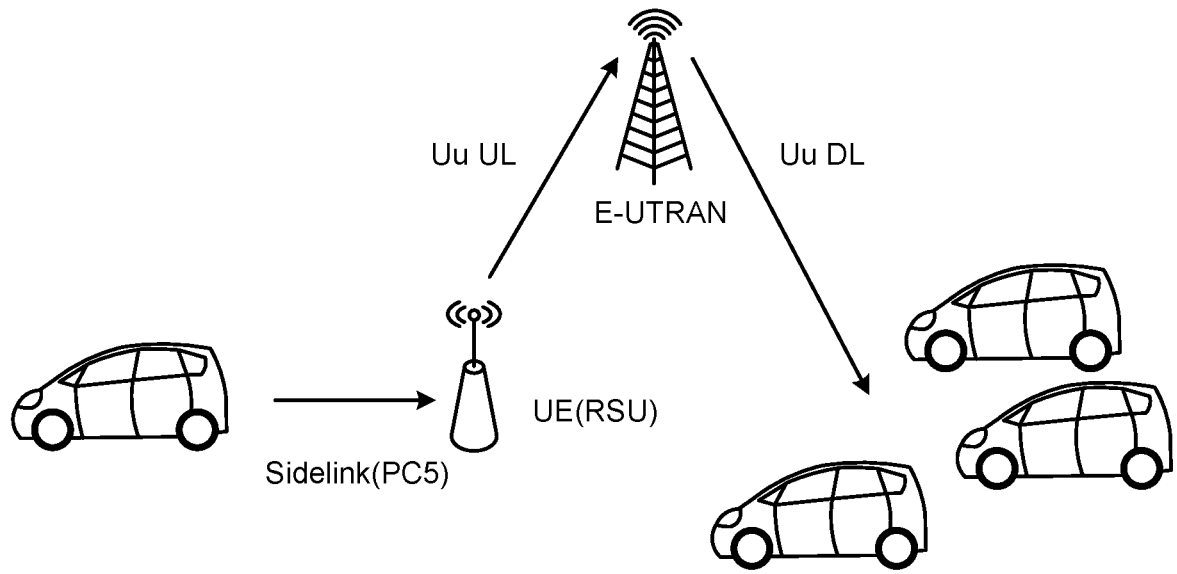
FIG. 6 is a diagram for explaining an example of a V2X operation scenario.
Figure 7:
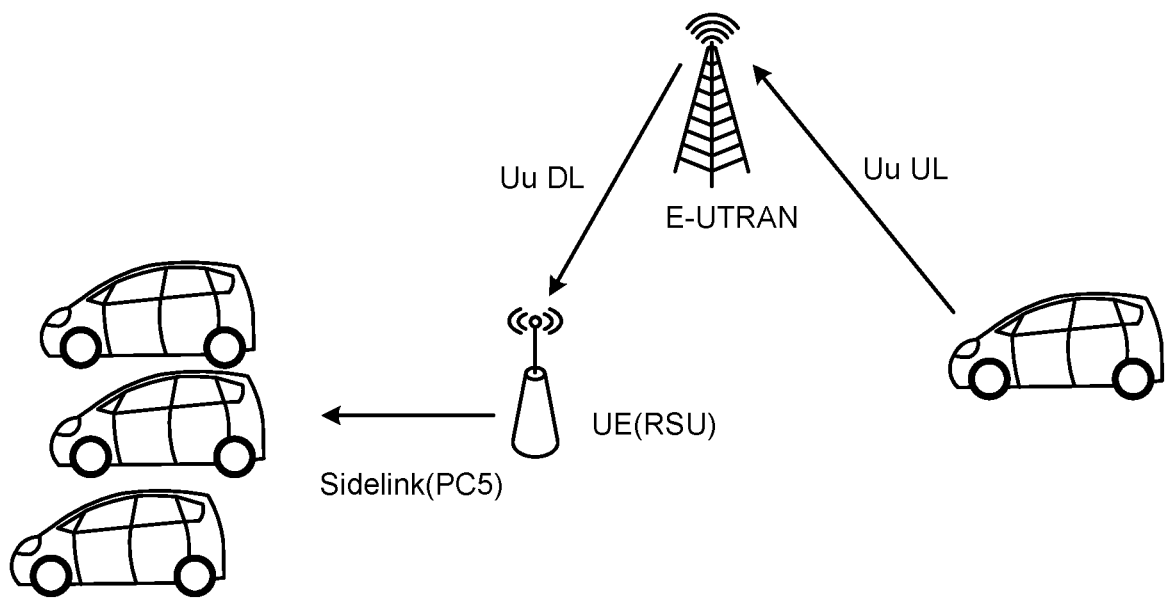
FIG. 7 is a diagram for explaining an example of a V2X operation scenario.
Figure 8:
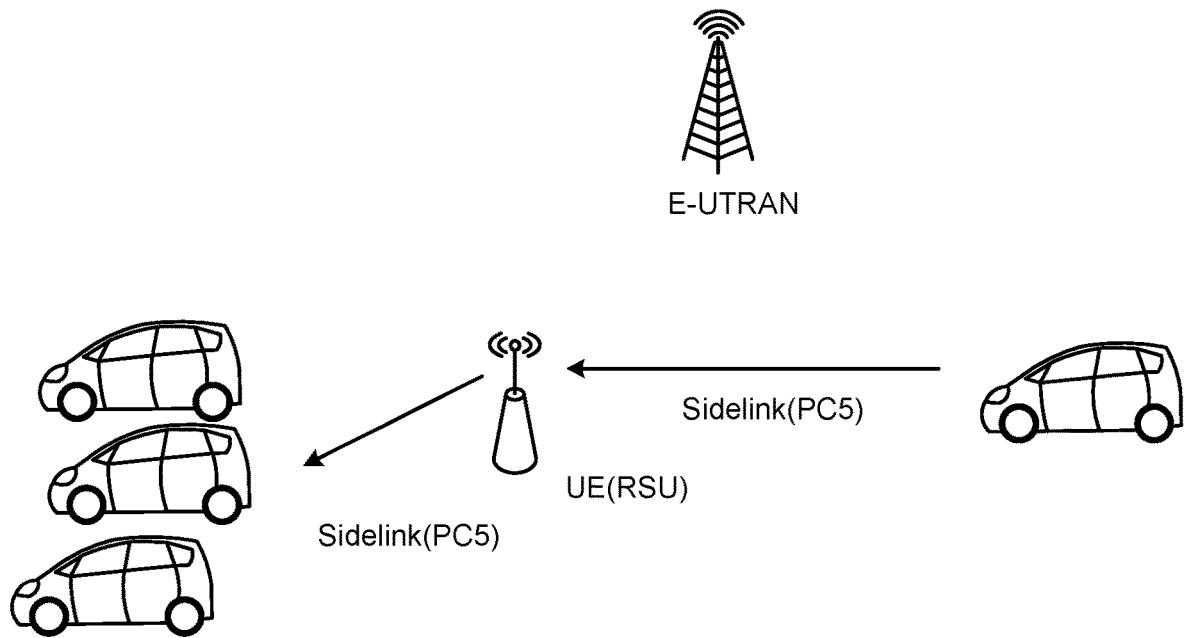
FIG. 8 is a diagram for explaining an example of a V2X operation scenario.
Figure 9:
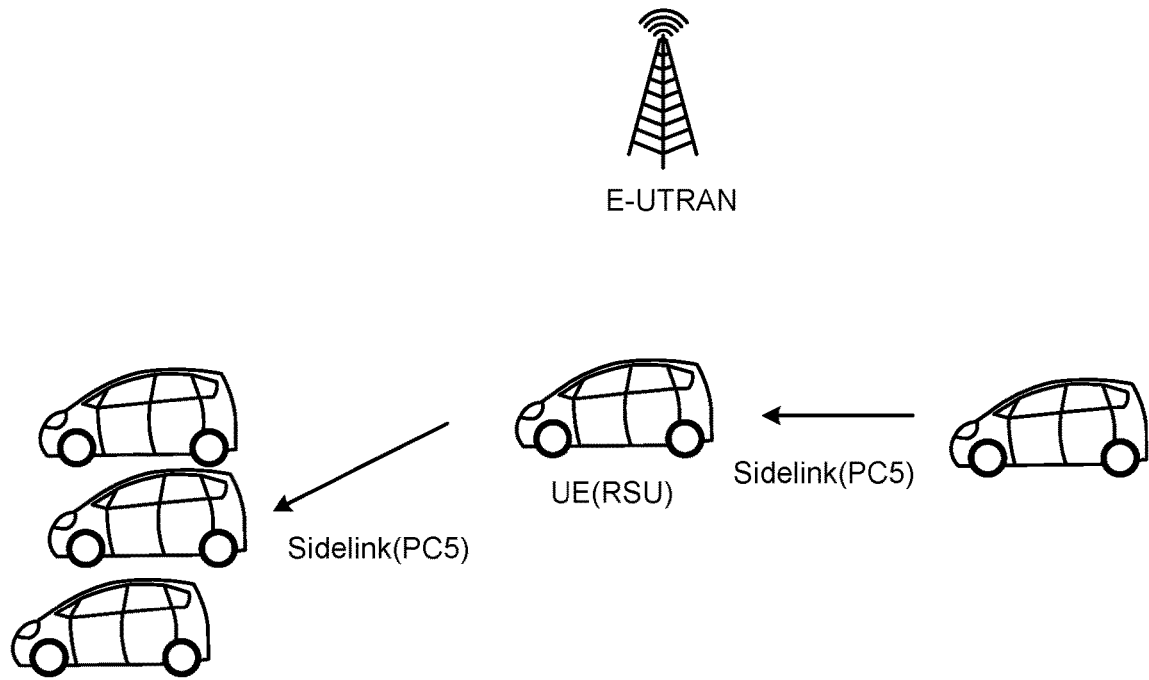
FIG. 9 is a diagram for explaining an example of a V2X operation scenario.

For example, FIGS. 4 to 9 are diagrams for explaining an example of a V2X operation scenario. Specifically, FIG. 4 illustrates a scenario in which vehicles directly communicate with each other without a base station (E-UTRAN). FIG. 5 illustrates a scenario in which vehicles communicate with each other via a base station. FIGS. 6 and 7 illustrate a scenario in which vehicles communicate with each other via a terminal device (UE, in this example, RSU) and a base station. FIGS. 8 and 9 illustrate a scenario in which vehicles communicate with each other via a terminal device (UE, in this example, RSU or other vehicle).

In FIGS. 4 to 9, a "sidelink" corresponds to a communication link between terminal devices, and is also referred to as a PC5. Specific examples of the sidelink include communication links of V2V, V2P, and V2I. The "Uu interface" corresponds to a wireless interface between a terminal device and a base station. A specific example of the Uu interface includes a V2N communication link. The "PC5 interface" corresponds to a wireless interface between terminal devices.

<1.2. Extension Example of Sidelink Communication>

Various extension examples can be considered for sidelink communication. For example, the above-described V2X communication is one of extension examples of sidelink communication. In addition to this, device to device (D2D) communication, machine-type communication (MTC), moving cell, relay communication, and the like are considered as an extension example of sidelink communication. An extension example of the sidelink communication will be described below with reference to FIGS. 10 to 13.

Figure 10:
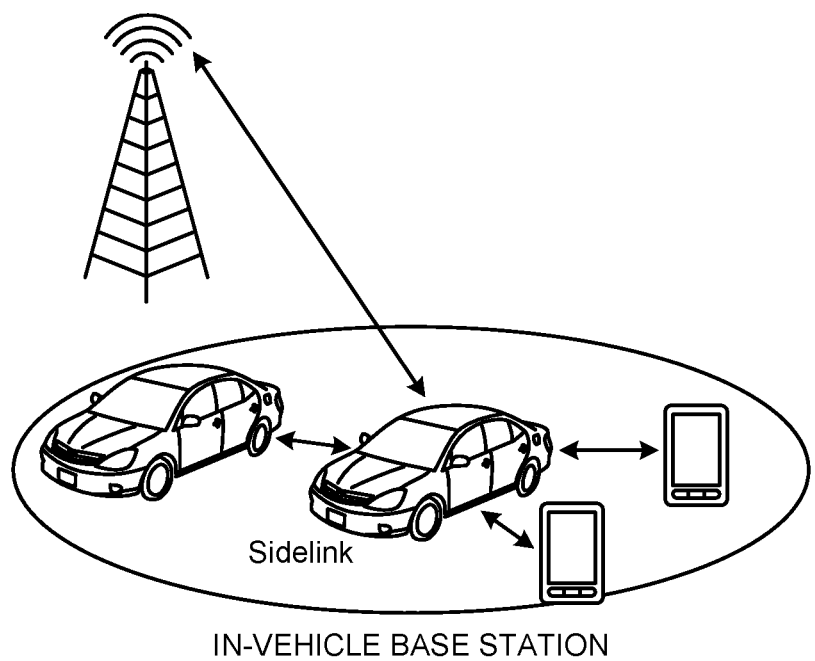
FIG. 10 is a diagram for describing an extension example of sidelink communication.

FIG. 10 illustrates an example in which sidelink communication is used by an in-vehicle base station mounted on a vehicle. As illustrated in FIG. 10, the in-vehicle base station performs communication with surrounding terminal devices (for example, a UE in the same vehicle) or vehicle-to-vehicle communication with other vehicles by sidelink communication. The in-vehicle base station may be UE, RSU, or the like.

Figure 11:
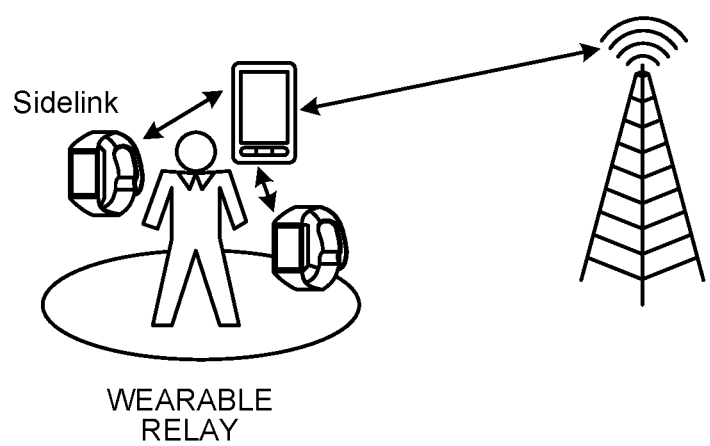
FIG. 11 is a diagram for describing an extension example of sidelink communication.

FIG. 11 illustrates an example in which sidelink communication is used for relay communication for a wearable terminal provided by UE. As illustrated in FIG. 11, the UE performs sidelink communication with the wearable terminal and relays communication between the wearable terminal and the base station.

Figure 12:
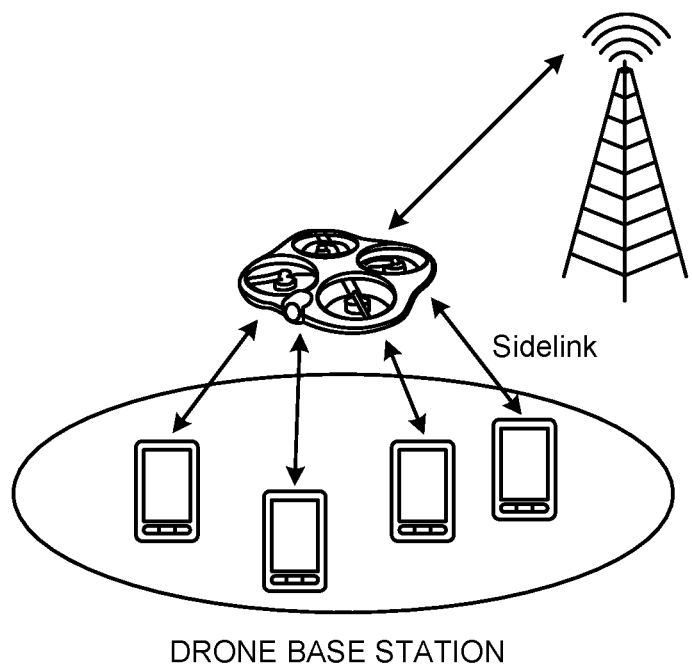
FIG. 12 is a diagram for describing an extension example of sidelink communication.

FIG. 12 illustrates an example in which sidelink communication is used by a drone base station mounted on a drone. As illustrated in FIG. 12, the drone base station performs sidelink communication with surrounding UEs and relays communication between the UEs and the base station.

Figure 13:
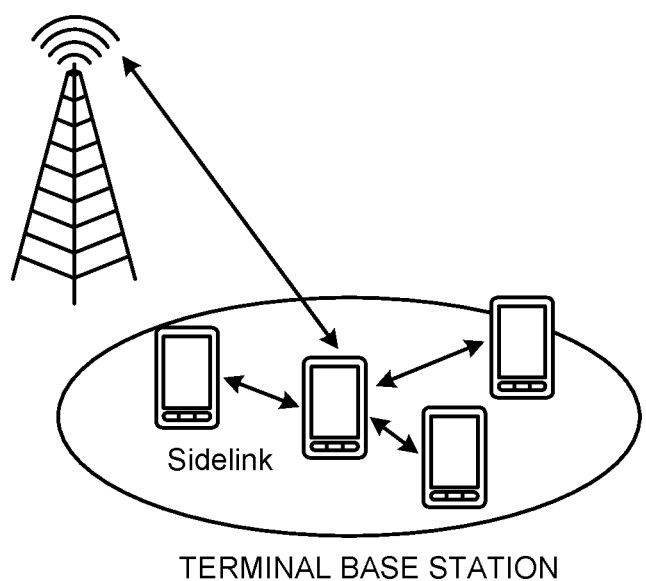
FIG. 13 is a diagram for describing an extension example of sidelink communication.

FIG. 13 illustrates an example in which sidelink communication is used by a terminal base station mounted on the UE. As illustrated in FIG. 13, the terminal base station performs sidelink communication with surrounding UEs, and relays communication between the UEs and the base station.

In addition to this, factory automation can be mentioned as an extension example of sidelink communication. In that case, sidelink communication may be used for communication between robots in the factory. For example, sidelink communication is used in a use case where an emergency stop signal is broadcast to a robot group to emergently stop a production line. As an extension example of the sidelink communication, there is communication between drones.

<1.3. Sidelink Resource Allocation Method>

Next, an outline of a method of resource allocation to the sidelink will be described. As a method of resource allocation to the sidelink, there are method A in which the base station allocates a resource of the sidelink and method B in which the terminal device performs sensing to select a resource of the sidelink. Note that method A is also referred to as "Mode 3" in LTE and "Mode 1" in NR, and method B is also referred to as "Mode 4" in LTE and "Mode 2" in NR. When LTE and NR are not distinguished from each other, they are simply described as methods A and B. Hereinafter, these will be described with reference to FIG. 14.

Figure 14:
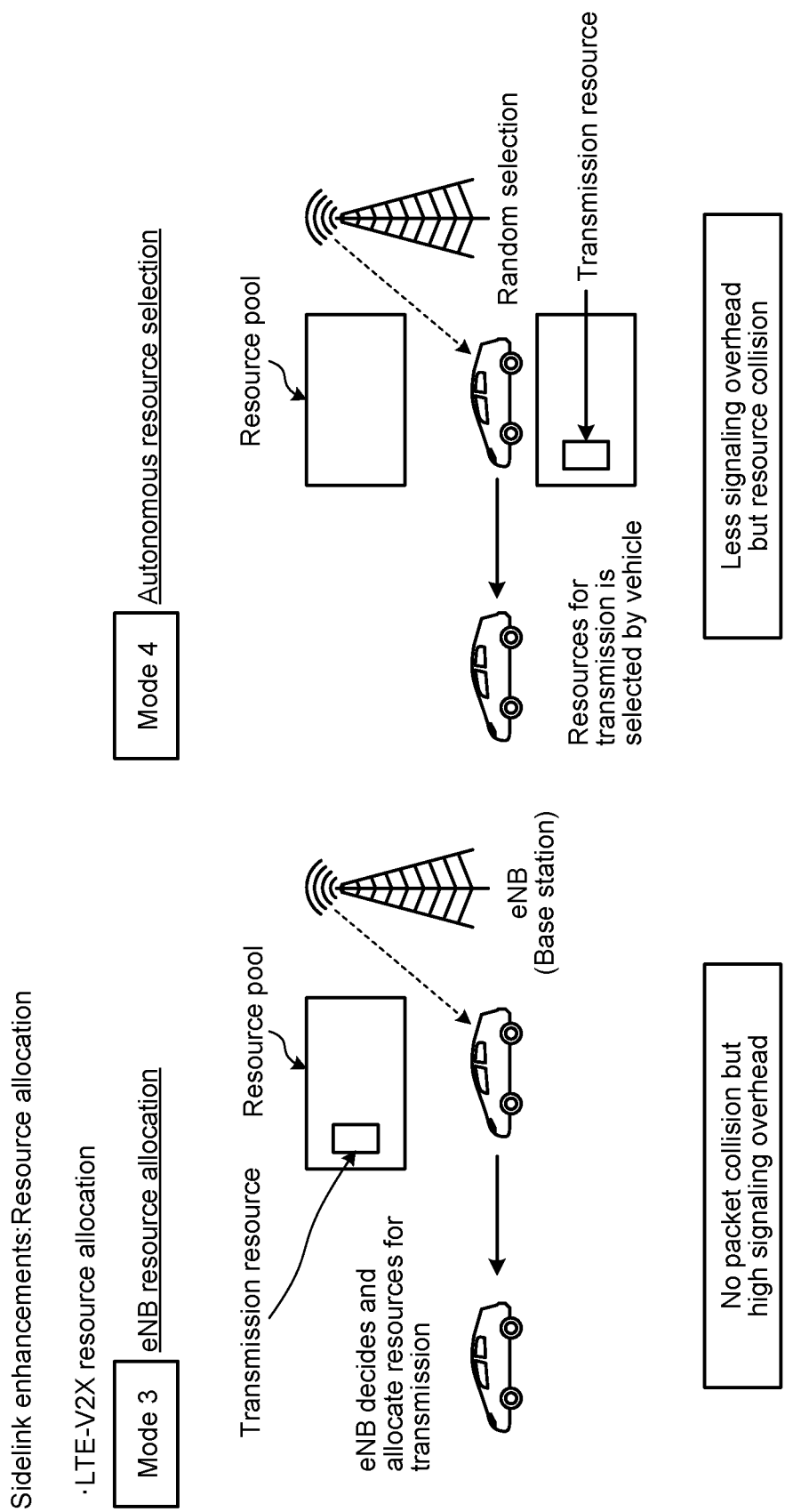
FIG. 14 is a diagram for explaining a sidelink resource allocation method.

FIG. 14 is a diagram for describing a sidelink resource allocation method. The left diagram of FIG. 14 illustrates an example of method A. In method A, a resource pool is allocated in advance, and when a transmission packet occurs in the terminal, a resource to be used for transmission of the packet in the resource pool is allocated by the base station. In method A, since resource allocation is performed by the base station every time a transmission packet occurs, packet collision does not occur, while high signaling overhead occurs. The right diagram of FIG. 14 illustrates an example of method B. In method B, a resource pool is allocated in advance, and when a transmission packet occurs, the terminal autonomously selects a resource to be used for transmission of the packet in the resource pool. In method B, while signaling overheads are small, packet collisions may occur.

—Resource Pool Allocation

In performing method A or method B, resource pool allocation is performed in advance. The allocation of the resource pool is performed by, for example, the base station.

As another example, the resource pool may be allocated by pre-configuration. In method B, the terminal device senses a resource for sidelink communication from the allocated resource pool, and selects an appropriate resource by itself to perform communication.

Figure 15:
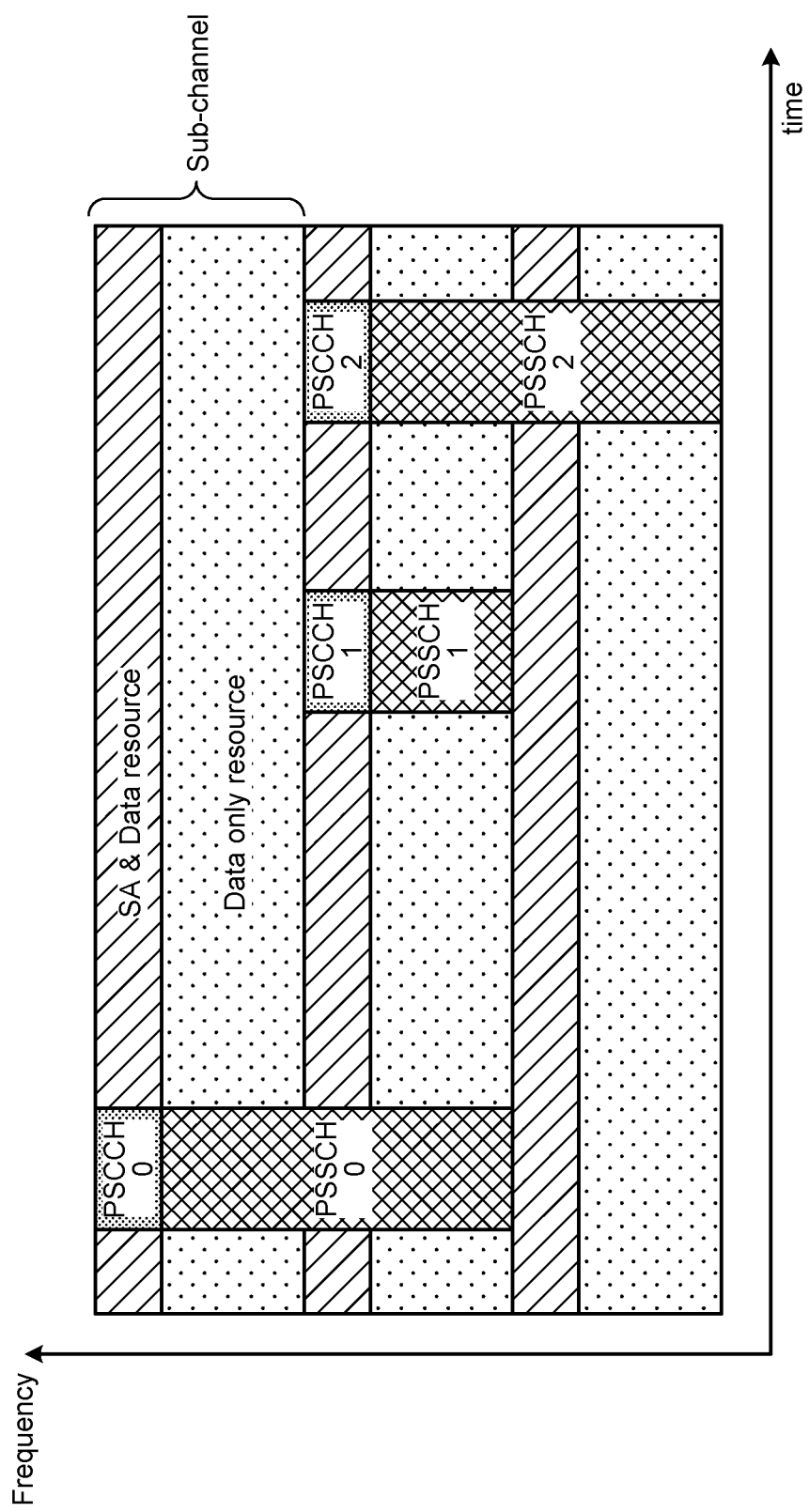
FIG. 15 is a diagram illustrating an example of a configuration of resources allocated to sidelink communication.

For example, FIG. 15 is a diagram illustrating an example of a configuration of resources (resource pool) allocated to sidelink communication, and illustrates an example of a case where frequency division multiplexing (FDM) is applied. As illustrated in FIG. 15, the resource pool is divided into a scheduling assignment (SA) area and a data area, and a physical sidelink control channel (PSCCH) and a physical sidelink shared channel (PSSCH) are transmitted by each area. Note that, hereinafter, description will be given focusing on a case where FDM is applied as illustrated in FIG. 15, but the application of the technology according to the present disclosure is not necessarily limited. As a specific example, even in a case where time division multiplexing (TDM) is applied, the technology according to the present disclosure described below can be applied. When TDM is applied, the SA area and the data area are orthogonal to each other on the time axis.

—Method B

Figure 16:
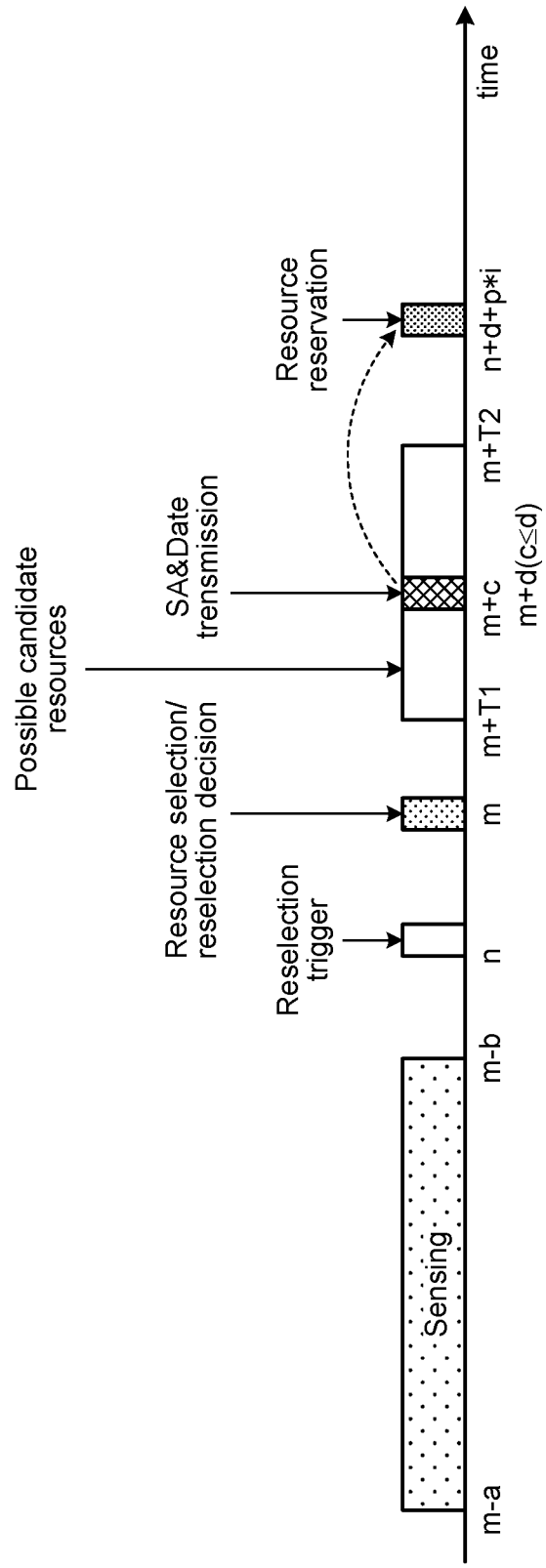
FIG. 16 is an explanatory diagram for describing an example of an operation timeline in a case where a terminal device transmits a packet on the basis of a method B.

An outline of method B will be described with reference to FIG. 16. FIG. 16 is an explanatory diagram for describing an example of an operation timeline in a case where the terminal device transmits a packet based on method B. As illustrated in FIG. 16, a terminal device that transmits a packet first performs sensing to discover a resource used for transmission of the packet from a resource pool. Next, the terminal device selects a resource from the resource pool on the basis of the result of the sensing. Then, the terminal device transmits the packet using the selected resource. At this time, the terminal device reserves a resource to be used for subsequent packet transmission as necessary.

Figure 17:
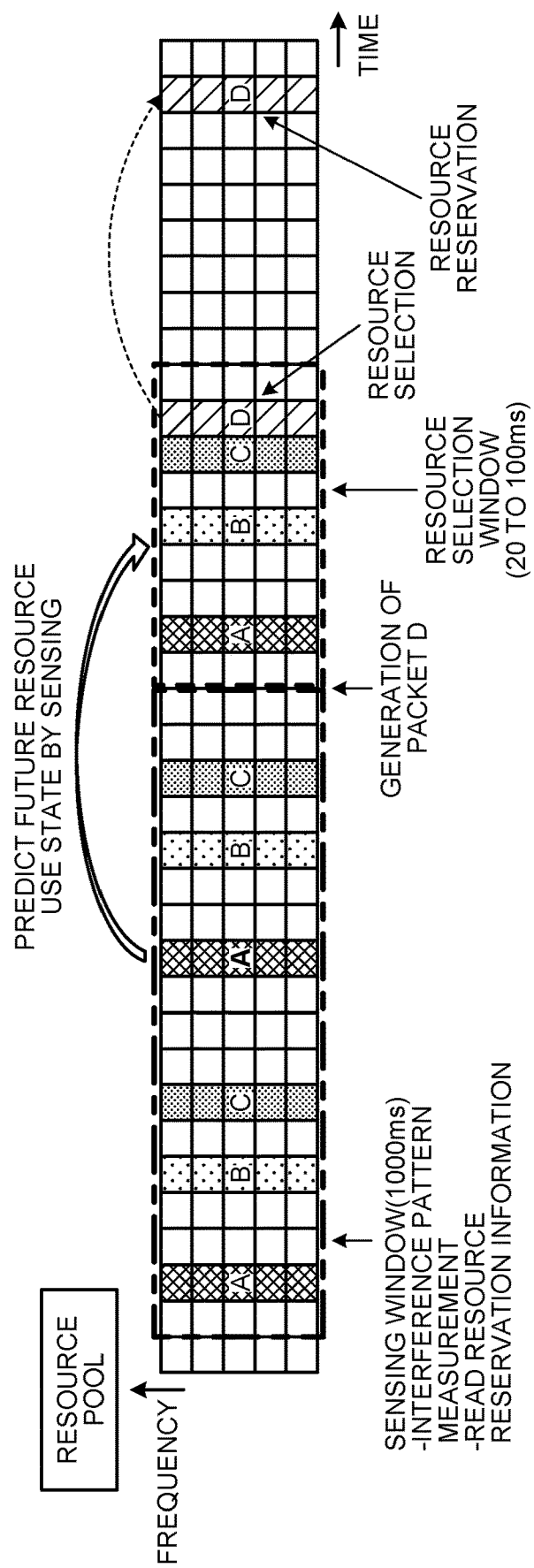
FIG. 17 is an explanatory diagram for explaining an example of sensing operation for selecting a resource from a resource pool.

Here, an example of the sensing operation will be described with reference to FIG. 17. FIG. 17 is an explanatory diagram for describing an example of a sensing operation for selecting a resource from a resource pool.

Specifically, the terminal device selects a resource in a resource selection window and reserves a future resource on the basis of the measurement result of an interference pattern in a sensing window and a reservation status of the resource in the sensing window. As a specific example, in the example illustrated in FIG. 17, in a case where a packet D to be transmitted occurs, the terminal device predicts a future resource use state, for example, a resource to be used for transmission of other packets A to C in the future on the basis of a sensing result. By using the result of the prediction, the terminal device can select or reserve a resource that can be used for transmission of the packet D, that is, a resource that is predicted not to be used for transmission of another packet.

Hereinafter, the description will be given assuming that the terminal device transmits the packet based on method B unless otherwise specified.

2. OUTLINE OF PROPOSED TECHNOLOGY 2.1. System Configuration Example

Figure 18:
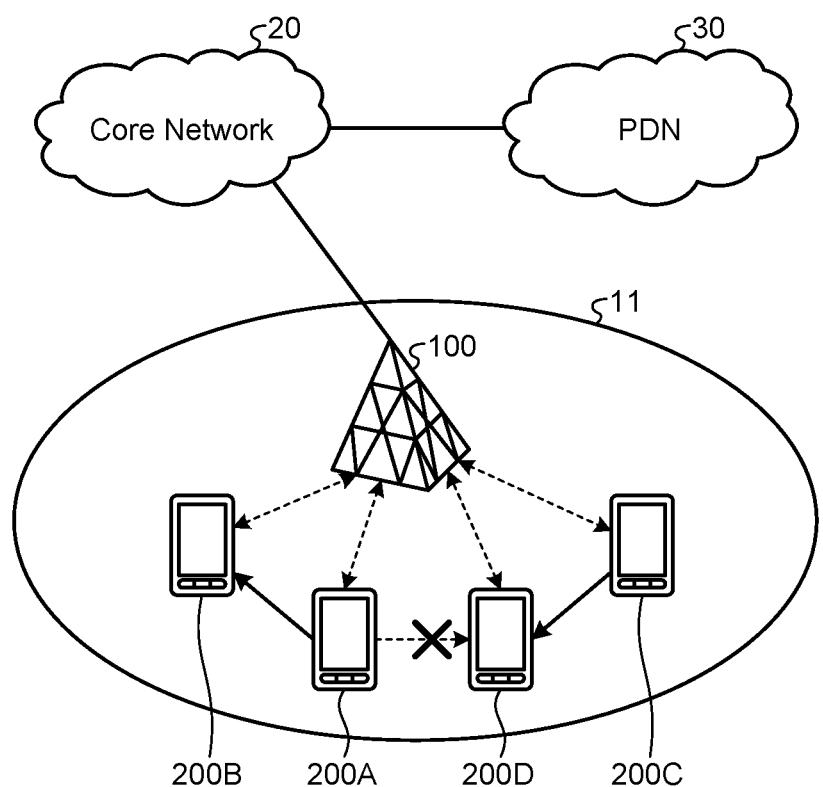
FIG. 18 is a diagram illustrating an example of a schematic configuration of a system according to an embodiment of the present disclosure.

Next, an example of a schematic configuration of a system to which the proposed technology is applied will be described with reference to FIG. 18. FIG. 18 is a diagram illustrating an example of a schematic configuration of a system 1 according to an embodiment of the present disclosure. As illustrated in FIG. 18, the system 1 includes a base station 100, terminal devices 200 (200A to 200D), a core network 20, and a packet data network (PDN) 30.

The base station 100 is a communication device that operates a cell 11 and provides a wireless service to one or more terminal devices 200 located inside the cell 11. The cell 11 can be operated according to any wireless communication method such as LTE or NR. The base station 100 is connected to the core network 20. The core network 20 is connected to the PDN 30.

The core network 20 may include, for example, a mobility management entity (MME), a serving gateway (S-GW), a PDN gateway (P-GW), a policy and charging rule function (PCRF), and a home subscriber server (HSS). Alternatively, the core network 20 may include an NR entity having a similar function. The MME is a control node that handles control plane signals and manages a movement state of the terminal device. The S-GW is a control node that handles user plane signals, and is a gateway device that switches a transfer path of user data. The P-GW is a control node that handles user plane signals, and is a gateway device serving as a connection point between the core network 20 and the PDN 30. The PCRF is a control node that performs control related to a policy such as quality of service (QoS) for a bearer and charging. The HSS is a control node that handles subscriber data and performs service control.

The terminal device 200 is a communication device that wirelessly communicates with other devices. For example, the terminal device 200 wirelessly communicates with the base station 100 on the basis of control by the base station 100. In this case, the terminal device 200 transmits an uplink signal to the base station 100 on the Uu link, and receives a downlink signal from the base station 100. For example, the terminal device 200 wirelessly communicates with another terminal device 200 on the basis of control by the base station 100 or autonomously. In this case, the terminal device 200 transmits the sidelink signal to the other terminal device 200 in the PC5 link, and receives the sidelink signal from the other terminal device 200. For example, the terminal device 200A transmits sidelink signals to the terminal device 200B, and the terminal device 200C transmits sidelink signals to the terminal device 200D. The terminal device 200 may be so-called user equipment (UE).

2.2. Technical Problems

In the existing sidelink communication, transmission is performed after a predetermined procedure for collision prevention, such as resource allocation from the base station in method A or sensing in method B, is performed. Therefore, a delay occurs from packet generation to packet transmission. Note that packet collision indicates that transmission and reception of a plurality of packets are performed using at least partially overlapping resources (time resources and frequency resources).

In a use case such as URLLC in which an urgent packet is transmitted with low latency and high reliability, a mechanism capable of transmitting a packet without such a delay and with high reliability is required. In particular, in the sidelink communication, unlike the normal grant-free transmission of the Uu link in which the base station performs entire control, the transmission subject is a plurality of terminal devices, and thus, it is necessary to take measures to avoid packet collision.

2.3. Outline of Proposed Technology

Therefore, the present disclosure provides a mechanism for avoiding collision of packets transmitted in the sidelink. In particular, a mechanism for avoiding a collision between a packet transmitted with low latency and high reliability (hereinafter, also referred to as a URLLC packet) and another packet in a URLLC use case is provided.

In the present disclosure, the terminal device 200 that transmits the URLLC packet performs so-called preemption in which the URLLC packet is transmitted using a resource selected or reserved for packet transmission by another terminal device 200. As a result, the terminal device 200 can omit a predetermined procedure for collision prevention such as sensing, and can transmit the URLLC packet with low latency and high reliability.

Note that, hereinafter, transmission of a URLLC packet using a resource selected or reserved for packet transmission by another terminal device 200 is referred to as preempt or preemption. However, in addition to the preempt or the preemption, it can be also referred to as, for example, interrupt use of a resource, resource stealing, suspension, or the like.

Hereinafter, the terminal device 200 that performs preemption to transmit a URLLC packet is referred to as a first terminal device 200P, a preemptor 200P, or a UE1. Another terminal device 200 in which a resource selected or reserved in advance is preempted is referred to as a second terminal device 200E, a preemptee 200E, or a UE2. Note that, in a case where it is not necessary to distinguish the first and second terminal devices 200P and 200E, they are also simply referred to as terminal devices 200.

Figure 19:
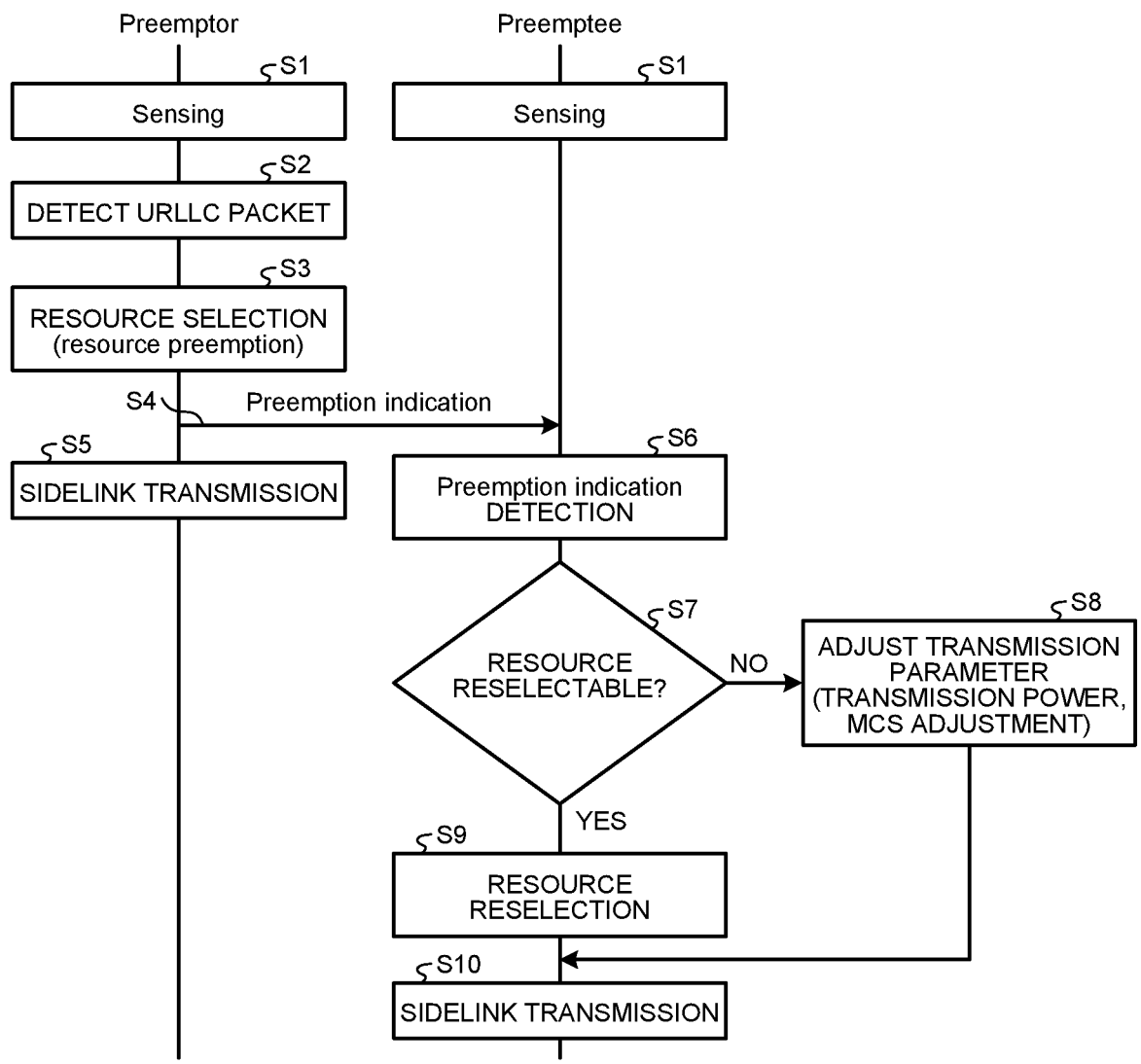
FIG. 19 is a sequence diagram for describing an outline of a wireless communication method according to the present embodiment.

FIG. 19 is a sequence diagram for describing an outline of the wireless communication method according to the present embodiment. Here, it is assumed that the second terminal device 200E reserves the resource R1 in advance for data packet transmission, and the first terminal device 200P preempts the resource R1 and transmits the URLLC packet. In order to distinguish from the URLLC packet, a packet to be transmitted without performing preemption is also referred to as a normal packet.

The terminal device 200 performs sensing while there is no packet to be transmitted (step S1). Upon detecting the URLLC packet (step S2), the first terminal device 200P selects a resource to be preempted on the basis of the sensing result of step S1 (step S3). Specifically, for example, the first terminal device 200P selects a resource selected or reserved for transmitting a packet with a transmission priority lower than the transmission priority of the URLLC packet. Here, the first terminal device 200P make the resource R1 reserved by the second terminal device 200E a resource to be preempted. The packet transmission priority is included in, for example, sidelink control information (SCI) transmitted before the data packet is transmitted.

The first terminal device 200P transmits information (preemption indication) indicating that the URLLC packet is transmitted by preempting the resource R1 selected in step S3 (step S4), and transmits the URLLC packet in the sidelink (step S5).

Upon detecting the preemption indication (step S6), the second terminal device 200E determines whether reselection of resources is possible (step S7). The reselection of a resource requires a processing time for reselecting the resource, and thus there is a possibility that the reselection of the resource will not be in time depending on the reception timing of the preemption indication.

Therefore, when it is determined that the resource cannot be reselected (step S7; No), the second terminal device 200E adjusts a packet transmission parameter (step S8). Here, the adjustment of the transmission parameter includes, for example, lowering transmission power, switching a modulation method and a coding method (MCS: Modulation and Coding Scheme) to a high-efficiency method, and the like.

The second terminal device 200E that is the preemptee lowers the transmission power and transmits a packet, for example, so that interference (collision) with URLLC packet transmission of the first terminal device 200P can be avoided. Note that performing parameter adjustment to lower the transmission power includes the preemptee stopping transmission. This is because stopping the transmission is to reduce the transmission power to zero, and an effect of avoiding interference with the preemptor is also obtained.

The second terminal device 200E that is the preemptee adjusts the MCS to a high-efficiency method, so that it is possible to reduce necessary resources (for example, the number of resource blocks). As a result, it is possible to reduce an overlapping portion between the resource of the URLLC packet transmitted by the first terminal device 200P that is the preemptor and the resource of the packet transmitted by the second terminal device 200E that is the preemptee. Therefore, the collision range between the resource of the URLLC packet and the resource of the packet transmitted by the second terminal device 200E can be changed from, for example, a full overlap state to a partial overlap state, and interference of the second terminal device 200E with the first terminal device 200P can be suppressed (reduced).

On the other hand, in a case where the resource can be reselected (step S7; Yes), the second terminal device 200E reselects the resource (step S9), and transmits the data packet in the sidelink (step S10).

As described above, the first terminal device 200P preempts a resource for transmitting a packet having a lower priority than the URLLC packet. As a result, the first terminal device 200P can transmit the URLLC packet without preventing the transmission of the packet with high priority, and thus, can reduce the packet collision. Since the second terminal device 200E adjusts the transmission parameters and transmits the data packet, it is possible to avoid collision with the URLLC packet. As a result, it is possible to reduce collision of packets transmitted in the sidelink.

Note that, here, the second terminal device 200E performs the reselection of the preempted resource, but the present invention is not limited thereto. For example, in a case where the second terminal device 200E has reserved a future resource including the resource R1, the resource which has been reserved may also be reselected. In this manner, the second terminal device 200E may reselect not only the preempted resource R1 but also a resource related to the resource R1 (in this example, a resource reserved at the same time as the resource R1).

3. CONFIGURATION EXAMPLE

Hereinafter, a configuration example of each device involved in the proposed technology will be described.
3.1. Configuration Example of Base Station 100

Figure 20:
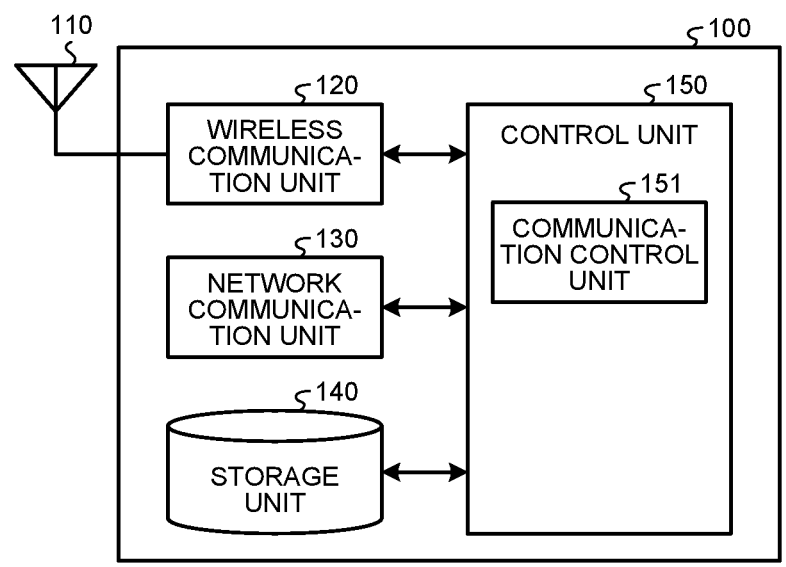
FIG. 20 is a block diagram illustrating an example of a logical configuration of a base station according to the embodiment.

FIG. 20 is a block diagram illustrating an example of a logical configuration of the base station 100 according to the present embodiment. As illustrated in FIG. 20, the base station 100 according to the present embodiment includes an antenna unit 110, a wireless communication unit 120, a network communication unit 130, a storage unit 140, and a control unit 150.

The antenna unit 110 radiates a signal output from the wireless communication unit 120 into the space as a radio wave. The antenna unit 110 converts the radio wave in the space into a signal and outputs the signal to the wireless communication unit 120.

The wireless communication unit 120 transmits and receives signals. For example, the wireless communication unit 120 receives an uplink signal from the terminal device and transmits a downlink signal to the terminal device.

The network communication unit 130 transmits and receives information. For example, the network communication unit 130 transmits information to other nodes and receives information from other nodes. For example, the other nodes include other base stations and core network nodes.

The storage unit 140 temporarily or permanently stores programs and various pieces of data for the operation of the base station 100.

Figure 21:
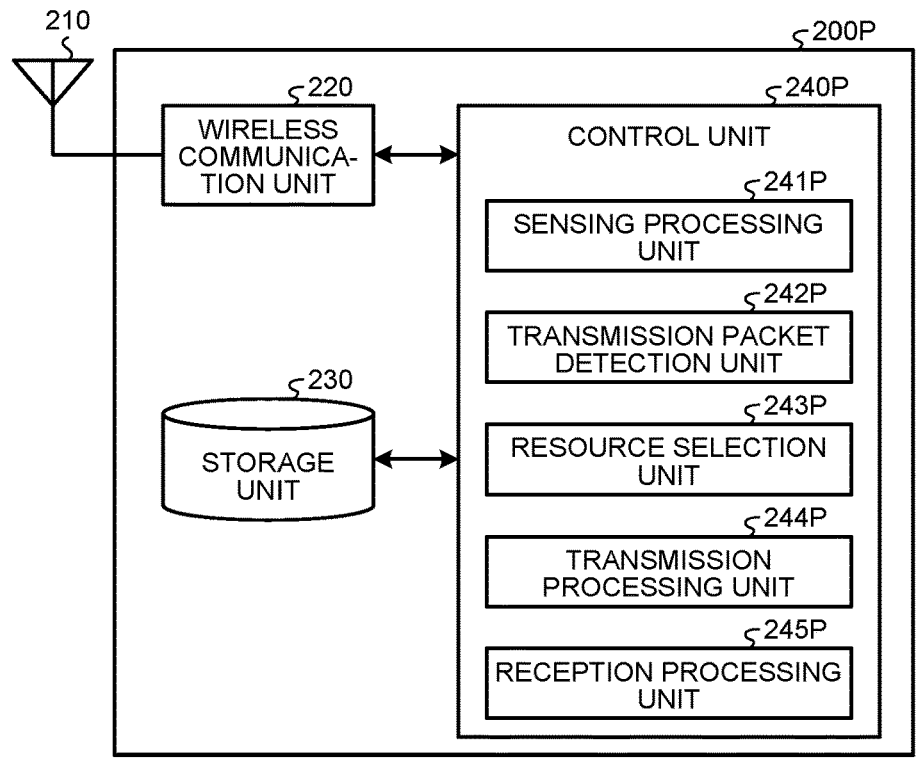
FIG. 21 is a block diagram illustrating an example of a logical configuration of a first terminal device according to the embodiment.

The control unit 150 provides various functions of the base station 100. For example, the control unit 150 includes a communication control unit 151. The communication control unit 151 has a function of controlling sidelink communication by the terminal device 200 under control, such as allocation of a resource pool to the terminal device 200, allocation of a resource to the terminal device 200 in which a transmission packet occurs, and a retransmission instruction of a colliding packet. The control unit 150 may further include other components other than the communication control unit 151. That is, the control unit 150 can also perform operations other than the operation of the communication control unit 151.
3.2. Configuration Example of First Terminal Device 200P FIG. 21 is a block diagram illustrating an example of a logical configuration of the first terminal device 200P according to the present embodiment. As illustrated in FIG. 21, the first terminal device 200P according to the present embodiment includes an antenna unit 210, a wireless communication unit 220, a storage unit 230, and a control unit 240P.

The antenna unit 210 radiates a signal output from the wireless communication unit 220 into the space as a radio wave. The antenna unit 210 converts the radio wave in the space into a signal and outputs the signal to the wireless communication unit 220.

The wireless communication unit 220 transmits and receives signals. For example, the wireless communication unit 220 receives a downlink signal from the base station 100 and transmits an uplink signal to the base station 100. The wireless communication unit 220 transmits and receives sidelink signals (V2P signals, V2V signals, V2I signals and the like) to and from another terminal device 200.

The storage unit 230 temporarily or permanently stores programs and various pieces data for the operation of the first terminal device 200P.

The control unit 240P provides various functions of the first terminal device 200P. For example, the control unit 240P includes a sensing processing unit 241P, a transmission packet detection unit 242P, a resource selection unit 243P, a transmission processing unit 244P, and a reception processing unit 245P.

The sensing processing unit 241P has a function of sensing a resource use state in order to select a resource for packet transmission. The transmission packet detection unit 242P detects a transmission packet to be transmitted to another terminal device 200, for example, a URLLC packet. The transmission packet is data related to one process generated in the terminal device 200. The data is, for example, data related to one transmission job generated in various programs (for example, an application program or an operating system) executed by the terminal device 200. Note that such data may be divided into a plurality of pieces of data and transmitted in a plurality of transmission packets.

For example, the resource selection unit 243P selects a resource for transmitting the transmission packet detected by the transmission packet detection unit 242P on the basis of the result of sensing of the resource use state performed by the sensing processing unit 241P. It is assumed that the transmission packet detection unit 242P detects, for example, a URLLC packet. In this case, the resource selection unit 243P selects a resource selected or reserved by another terminal device 200 for transmitting a packet having a lower priority than the URLLC packet as a resource for transmitting the URLLC packet.

The transmission processing unit 244P has a function of transmitting a transmission packet input from an upper layer. For example, in a case where the URLLC packet is transmitted using a resource selected or reserved by another terminal device 200, the transmission processing unit 244P notifies that preemption is to be performed before transmitting the URLLC packet. Note that the first terminal device 200P may explicitly notify that preemption is to be performed, for example, by providing a field indicating preemption in the SCI or the like, or the first terminal device 200P may implicitly notify that the resource is used, for example, using the SCI.

Note that, hereinafter, the SCI transmitted by the transmission processing unit 244P for preemption is also referred to as a preemption indication (PI)-SCI to be distinguished from the SCI transmitted for a normal packet. The PI-SCI may be an SCI transmitted before the transmission processing unit 244P performs preemption, and it does not matter whether there is a field indicating preemption.

The reception processing unit 245P has a function of receiving and decoding a packet and outputting the packet to the upper layer. The control unit 240P can further include other components other than these components. That is, the control unit 240P can also perform operations other than the operations of these components.

3.3. Configuration Example of Second Terminal Device 200E

Figure 22:
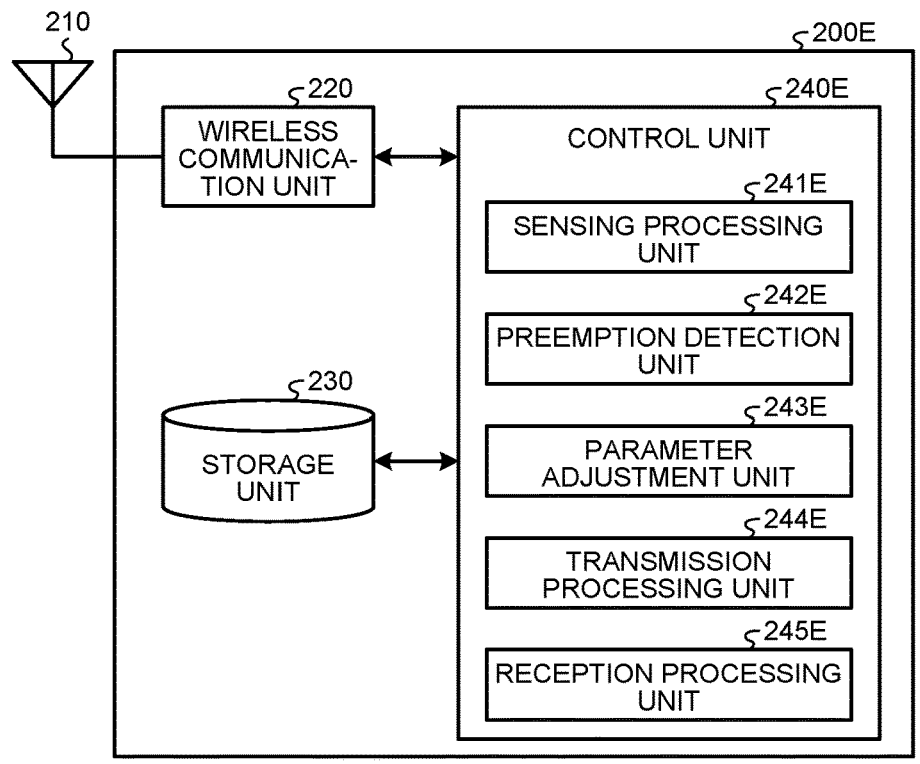
FIG. 22 is a block diagram illustrating an example of a logical configuration of a second terminal device according to the embodiment.

FIG. 22 is a block diagram illustrating an example of a logical configuration of the second terminal device 200E according to the present embodiment. As illustrated in FIG. 22, the second terminal device 200E according to the present embodiment includes an antenna unit 210, a wireless communication unit 220, a storage unit 230, and a control unit 240E. Since the configuration excluding the control unit 240E is the same as that of the first terminal device 200P illustrated in FIG. 21, the description thereof will be omitted.

The control unit 240E provides various functions of the second terminal device 200E. For example, the control unit 240E includes a sensing processing unit 241E, a preemption detection unit 242E, a parameter adjustment unit 243E, a transmission processing unit 244E, and a reception processing unit 245E.

The sensing processing unit 241E has a function of sensing a resource use state in order to select a resource for packet transmission. The preemption detection unit 242E detects preemption by the first terminal device 200P, for example. For example, in a case where the first terminal device 200P transmits an SCI provided with a field indicating preemption, the preemption detection unit 242E detects the preemption by detecting the content of the field. Alternatively, it is assumed that the first terminal device 200P implicitly notifies the preemption by transmitting the SCI without providing such a field. In this case, the preemption detection unit 242E detects preemption by the first terminal device 200P depending on whether the resource used by the first terminal device 200P overlaps with the resource used by the second terminal device 200E.

In a case where the preemption detection unit 242E detects preemption, the parameter adjustment unit 243E adjusts a transmission parameter of a packet which was scheduled to be transmitted using the preempted resource. The parameter adjustment unit 243E adjusts at least one of the transmission power, the MCS, or the packet size as adjustment of the transmission parameter.

For example, the parameter adjustment unit 243E adjusts the transmission parameter on the basis of the information of the communication quality (for example, SL-RSRP) of the sidelink so that the packet transmission by the subject device does not interfere with the transmission of the URLLC packet by the first terminal device 200P. Alternatively, the parameter adjustment unit 243E may adjust the transmission parameters on the basis of the position of the terminal device 200. Specifically, for example, the parameter adjustment unit 243E adjusts the transmission parameters according to the positions of the first terminal device 200P and its communication partner and the positions of the second terminal device 200E and its communication partner.

For example, the parameter adjustment unit 243E adjusts the transmission power as a transmission parameter. In the case of V2X communication, the packet is transmitted at a specified maximum power, but in a case where the resource is preempted, the parameter adjustment unit 243E adjusts the packet to be transmitted at a transmission power smaller than the specified maximum power, for example.

Alternatively, by changing the MCS, the parameter adjustment unit 243E adjusts the transmission parameter so that the packet transmission by the subject device does not interfere with the transmission of the URLLC packet by the first terminal device 200P.

The parameter adjustment unit 243E may adjust the packet size by dividing a packet which was scheduled to be transmitted using the preempted resource, for example. For example, in a case where the preempted resource is a part of the resource selected for packet transmission, the parameter adjustment unit 243E adjusts the size of the packet to a size that can be transmitted by a resource that is not preempted. As a result, the second terminal device 200E can transmit a part of the packet using the resource that does not interfere with the transmission of the URLLC packet by the first terminal device 200P.

As described above, by the parameter adjustment unit 243E adjusting the transmission parameter, interference with the transmission of the URLLC packet by the first terminal device 200P can be reduced, and collision between the URLLC packet and the packet transmitted by the subject device can be avoided.

Here, the transmission parameter adjusted by the parameter adjustment unit 243E is at least one of the transmission power, the MCS, and the packet size, but is not limited thereto. The parameter adjustment unit 243E only needs to adjust the transmission parameters so that the packet transmission by the subject device does not interfere with the transmission of the URLLC packet by the first terminal device 200P, and may adjust parameters other than the above-described transmission parameters.

The parameter adjustment unit 243E reselects a resource to be used for packet transmission by the subject device. In this case, the parameter adjustment unit 243E selects a resource other than the preempted resource on the basis of the sensing result of the sensing processing unit 241E from, for example, the resource pool allocated from the base station 100.

As described above, the parameter adjustment unit 243E reselects the resource, so that it is possible to avoid a collision between the URLLC packet transmitted by the first terminal device 200P and the packet transmitted by the subject device.

Note that, here, in a case where there is no processing time for the parameter adjustment unit 243E to reselect a resource, the transmission parameter is adjusted, but the present invention is not limited thereto. For example, the resource may be reselected in a case where, even if the parameter adjustment unit 243E adjusts the transmission parameter, interference occurs in the transmission of the URLLC packet by the first terminal device 200P. Alternatively, the parameter adjustment unit 243E may adjust the transmission parameter in a case where the resource cannot be reselected, that is, there is no available resource in the resource pool.

In a case where the resource cannot be reselected and interference occurs in the transmission of the URLLC packet by the first terminal device 200P even if the transmission parameter is adjusted, the parameter adjustment unit 243E stops, for example, the transmission of the packet. When the transmission of the packet is stopped, the parameter adjustment unit 243E may discard the packet which was scheduled to be transmitted. In this case, the parameter adjustment unit 243E notifies the upper layer that packet transmission has failed. Alternatively, in a case where the transmission of the packet is stopped, the parameter adjustment unit 243E may transmit the packet after a certain period has elapsed, for example. In other words, in a case where the transmission of the packet is stopped, the parameter adjustment unit 243E postpones the transmission of the packet.

As described above, since the parameter adjustment unit 243E stops the transmission of the packet, it is possible to avoid a collision between the URLLC packet transmitted by the first terminal device 200P and the packet transmitted by the subject device.

Note that, here, the parameter adjustment unit 243E stops the transmission of the packet in a case where the resource cannot be reselected and interference occurs in the transmission of the URLLC packet by the first terminal device 200P even if the transmission parameter is adjusted, but the present invention is not limited thereto. For example, the parameter adjustment unit 243E may stop the transmission of the packet in one of a case where the resource cannot be reselected and a case where interference occurs in the transmission of the URLLC packet by the first terminal device 200P even if the transmission parameter is adjusted. Alternatively, in a case where the resource for packet transmission is preempted, the parameter adjustment unit 243E may stop packet transmission without reselecting the resource or adjusting the transmission parameter.

The transmission processing unit 244E has a function of transmitting a packet input from an upper layer. In a case where the resource selected or reserved for packet transmission is preempted, the transmission processing unit 244E transmits the packet with the transmission parameters adjusted by the parameter adjustment unit 243E. Alternatively, the transmission processing unit 244E transmits the packet using the resource reselected by the parameter adjustment unit 243E. Note that the transmission processing unit 244E transmits the SCI including the information regarding the transmission parameter adjusted by the parameter adjustment unit 243E or the reselected resource prior to packet transmission.

The reception processing unit 245E has a function of receiving and decoding a packet and outputting the packet to the upper layer. The control unit 240E may further include other components other than these components. That is, the control unit 240E can also perform operations other than the operations of these components.

4. TECHNICAL FEATURES

4.1. Preemption Target

First, resources to be preempted by the first terminal device 200P will be described before technical features are described.

Examples of resources to be preempted by the first terminal device 200P include the following.

Resources for initial transmission
Resources for reserved transmission
Resources for feedback transmission (PSFCH)

The resource for initial transmission is a resource in which a resource not reserved by the terminal device 200 is secured as a resource for packet transmission. Prior to transmitting a packet using the selected resource, the terminal device 200 requests radio wave utilization by transmitting an SCI designating the selected resource. As a result, the terminal device 200 secures the selected resource as a resource for initial transmission.

The reserved transmission resource is a resource that the terminal device 200 secures in advance for packet transmission. For example, the terminal device 200 transmits an SCI to be transmitted for securing resources for initial transmission by including information related to reservation of resources used for subsequent packet transmission. As a result, the terminal device 200 secures a resource for a packet to be transmitted in the future as a resource for reserved transmission.

The resource for feedback transmission is, for example, a resource secured for blind retransmission or HARQ-feedback transmission to the transmission side.

4.2. Preemption Processing by First Terminal Device 200P

Figure 23:
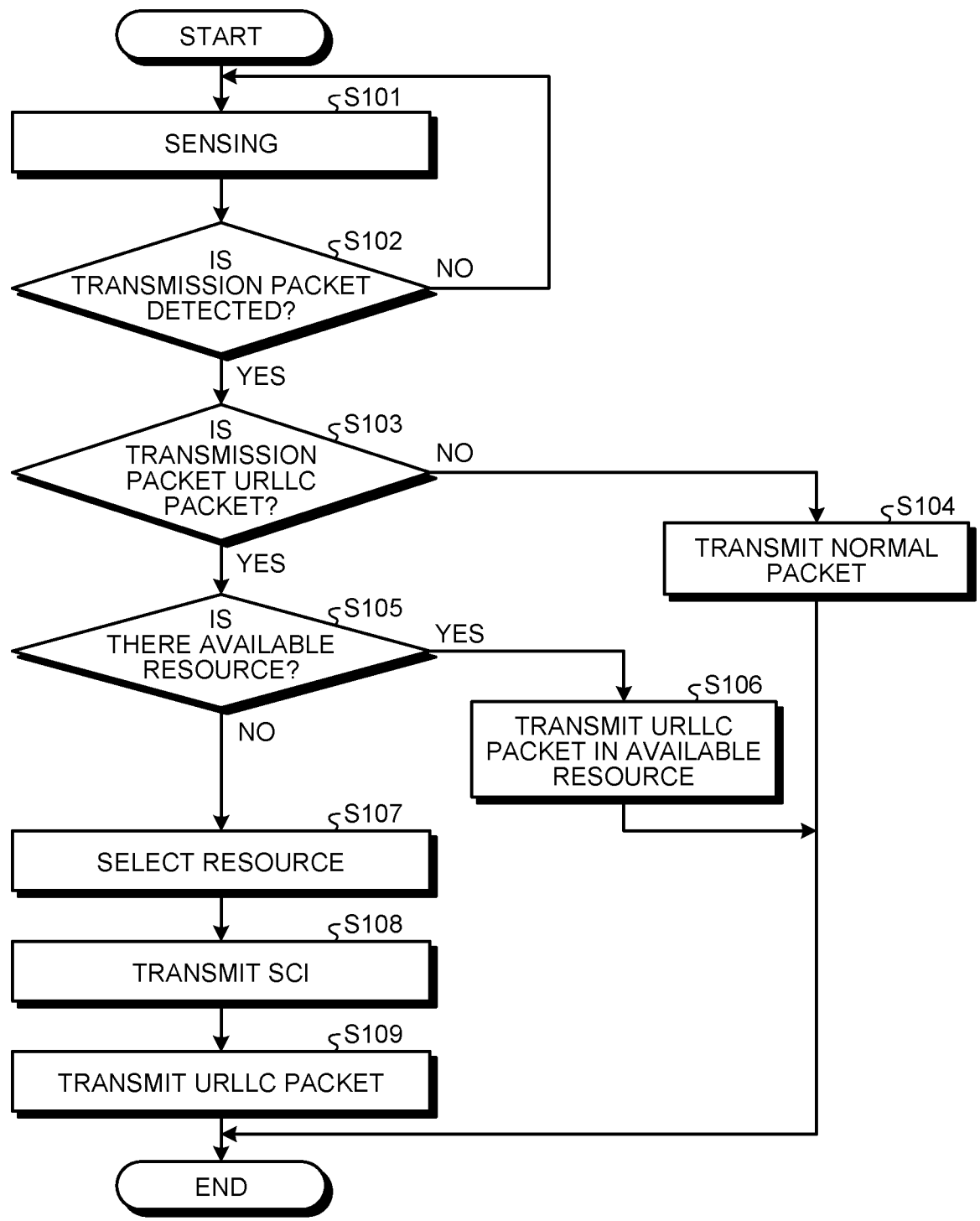
FIG. 23 is a flowchart for explaining preemption processing by the first terminal device according to the present embodiment.

First, the preemption processing by the first terminal device 200P will be described below. FIG. 23 is a flowchart for explaining preemption processing by the first terminal device 200P according to the present embodiment.

As illustrated in FIG. 23, the first terminal device 200P performs sensing while not performing packet transmission (step S101), and acquires information regarding a resource selected or reserved for packet transmission by another terminal device 200.

Next, the first terminal device 200P determines whether a transmission packet has been detected (step S102). When the transmission packet has not been detected (step S102; No), the process returns to step S101 to perform sensing. On the other hand, when a transmission packet is detected (step S102; Yes), the first terminal device 200P determines whether the transmission packet is a URLLC packet (step S103).

When it is determined that the transmission packet is not a URLLC packet (step S103; No), in other words, in a case where the transmission packet is a normal packet, the first terminal device 200P selects a resource on the basis of the sensing result and transmits the normal packet (step S104).

On the other hand, when it is determined that the transmission packet is a URLLC packet (step S103; Yes), the first terminal device 200P determines whether there is an available resource capable of transmitting the URLLC packet on the basis of the sensing result (step S105).

In a case where there is an available resource (step S105; Yes), the first terminal device 200P transmits the URLLC packet using the available resource (step S106). On the other hand, in a case where there is no available resource (step S105; No), the first terminal device 200P selects a resource selected or reserved by another terminal device 200 for packet transmission having a lower priority than the URLLC packet (step S107).

Subsequently, the first terminal device 200P transmits the SCI including the information regarding the transmission parameter of the URLLC packet using the selected resource (step S108). Thereafter, the first terminal device 200P transmits the URLLC packet (step S109).

In this manner, the first terminal device 200P preempts the resource according to the priority and transmits the URLLC packet. As a result, the first terminal device 200P can reduce collision with a packet transmitted by another terminal device 200.

4.3. Packet Transmission Processing by Second Terminal Device 200E

The packet transmission processing performed by the second terminal device 200E in a case where the resource is preempted differs depending on the transmission timing of the PI-SCI by the first terminal device 200P. Therefore, the packet transmission processing performed by the second terminal device 200E will be described in the following three patterns. Hereinafter, the first terminal device 200P may be referred to as UE1, and the second terminal device 200E may be referred to as UE2.

Figure 24A:
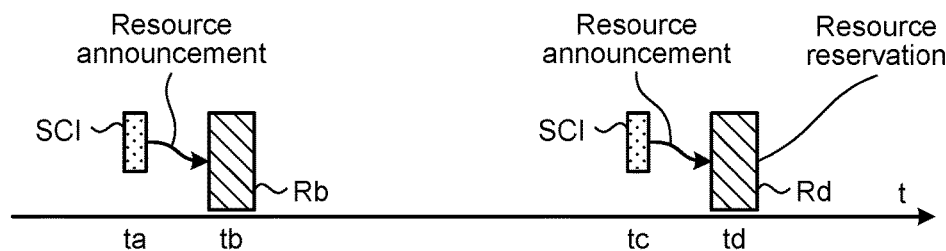
FIGS. 24A, 24B, and 24C are diagrams for explaining an example of packet transmission processing of the second terminal device according to the present embodiment.
Figure 24B:
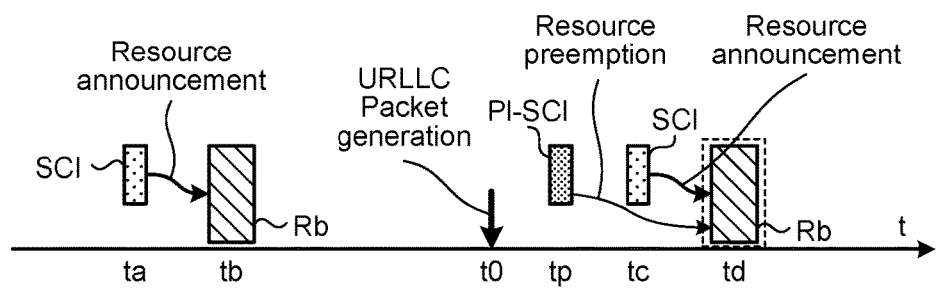
Figure 24C:
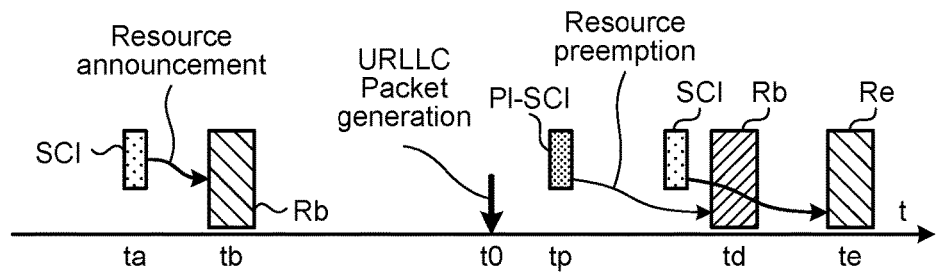

1) Case where PI-SCI is transmitted before SCI
2) Case where PI-SCI is transmitted after SCI
3) Case where PI-SCI and SCI are simultaneously transmitted (Case where PI-SCI is transmitted before SCI) First, a case where the first terminal device 200P transmits the PI-SCI including the preemption indication to perform preemption before the second terminal device 200E transmits the SCI will be described. FIGS. 24A, 24B, and 24C a are diagrams for describing an example of packet transmission processing of the second terminal device 200E according to the present embodiment.

FIG. 24A illustrates an example of packet transmission by the second terminal device 200E (UE2) in a case where preemption is not performed by the first terminal device 200P (UE1).

The second terminal device 200E transmits the SCI at time ta before transmitting the data packet, for example, and performs an announcement of the resource at time tb. The SCI transmitted at time ta includes, for example, information regarding the time tb and the transmission frequency, and the second terminal device 200E can secure (select) the resource Rb by transmitting the SCI at time ta. The SCI transmitted at time ta includes information regarding transmission parameters used for transmission in the resource Rb, such as transmission power and MCS.

The second terminal device 200E can reserve the resource (the resource Rd in FIG. 24A after the time tb using the SCI transmitted at time ta, for example. The second terminal device 200E transmits the SCI at time to before the data packet transmission on the reserved resource Rd, thereby making an announcement of the resource. In this manner, the second terminal device 200E transmits the data packet after transmitting the SCI.

A case where preemption is performed by the first terminal device 200P will be described with reference to FIG. 24B. Note that the process until the second terminal device 200E transmits the data packet at time tb is the same as that in FIG. 24A, and thus description thereof is omitted.

Here, it is assumed that the first terminal device 200P detects generation of a URLLC packet at time t0. In this case, the first terminal device 200P performs resource preemption of the resource Rd by transmitting the PI-SCI at time tp.

At this time, if the second terminal device 200E transmits data on the resource Rd without performing adjustment such as resource reselection, the data packet (in this example, the URLLC packet) transmitted by the first terminal device 200P and the data packet transmitted by the second terminal device 200E collide with each other.

Therefore, upon detecting the PI-SCI transmitted at time tp, the second terminal device 200E performs resource reselection, for example. FIG. 24C [(C)] illustrates an example in which the second terminal device 200E performs resource reselection.

When the resource Rd is preempted, the second terminal device 200E performs resource reselection. In FIG. 24C, it is assumed that the second terminal device 200E reselects a resource Re different from the resource Rd. In this case, the second terminal device 200E transmits the SCI designating the time and frequency resources for transmitting the data packet at time to, for example, and makes an announcement of the resource Re. Thereafter, the second terminal device 200E transmits the data packet at time te. As a result, even if the first terminal device 200P transmits the URLLC packet using the resource Rb, it is possible to avoid collision with the data packet of the second terminal device 200E.

Note that, here, in a case where the resource Rd is preempted, the second terminal device 200E reselects the resource; however, for example, the second terminal device 200E may adjust the transmission parameter of the data packet. Alternatively, the second terminal device 200E may stop the transmission of the data packet.

Figure 25A:
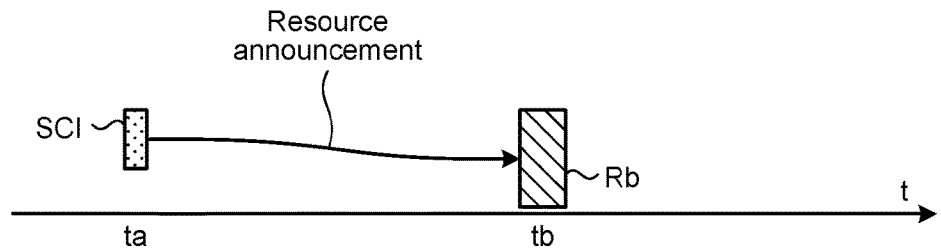
FIGS. 25A, 25B, and 25C are diagrams for explaining another example of packet transmission processing of the second terminal device according to the present embodiment.
Figure 25B:
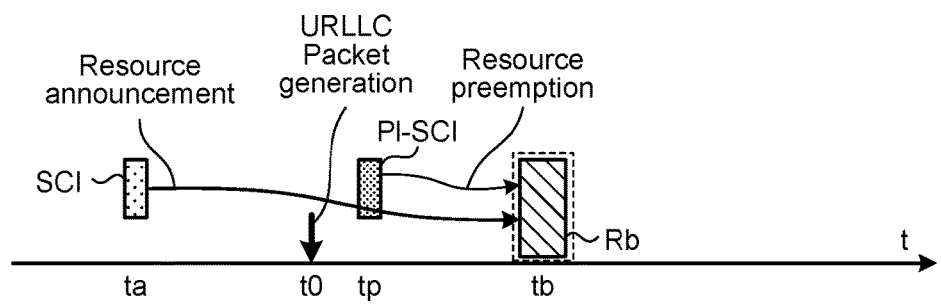
Figure 25C:
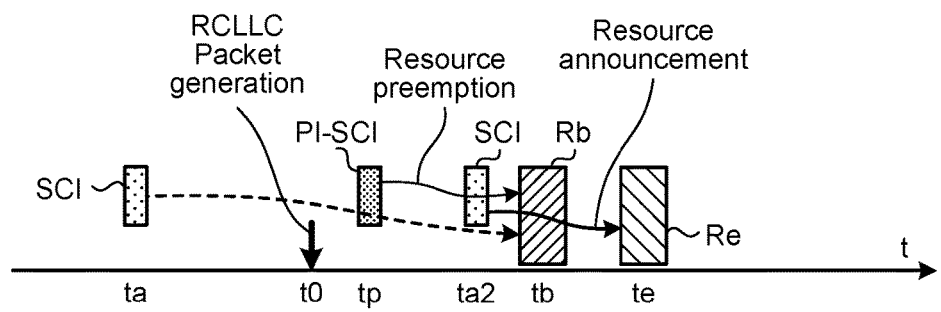

(Case where PI-SCI transmission is transmitted after SCI) Next, a case where the first terminal device 200P transmits the PI-SCI to perform preemption after the second terminal device 200E transmits the SCI will be described with reference to FIGS. 25A, 25B, and 25C. FIGS. 25A, 25B, and 25C are diagrams for describing another example of the packet transmission processing of the second terminal device 200E according to the present embodiment.

FIG. 25A illustrates an example of packet transmission by the second terminal device 200E (UE2) in a case where preemption is not performed by the first terminal device 200P (UE1).

The second terminal device 200E performs resource announcement of the resource Rb by transmitting the SCI at time ta, and transmits the data packet at time tb. At this time, as illustrated in FIG. 25B, it is assumed that the first terminal device 200P detects generation of a URLLC packet at time t0. In this case, the first terminal device 200P performs resource preemption of the resource Rd by transmitting the PI-SCI at time tp.

At this time, if the second terminal device 200E transmits data on the resource Rd without performing adjustment such as resource reselection, the data packet (in this example, the URLLC packet) transmitted by the first terminal device 200P and the data packet transmitted by the second terminal device 200E collide with each other.

Therefore, upon detecting the PI-SCI transmitted at time tp, the second terminal device 200E performs resource reselection, for example.

In the example illustrated in FIGS. 25A, 25B, and 25C, the second terminal device 200E has already made a resource announcement related to the resource Rb at time ta. Therefore, if the second terminal device 200E simply transmits the data packet on the reselected resource, the reception side cannot receive the data packet transmitted by the second terminal device 200E. This is because the reception side tries to receive the data packet transmitted in the resource Rb according to the SCI received at time ta.

Therefore, in a case where the reselection of the resource is performed, the second terminal device 200E performs resource announcement of the resource Re by transmitting the SCI again at time ta2 as illustrated in FIG. 25C. As a result, when the second terminal device 200E transmits the data packet on the reselected resource Re, the reception side can receive the data packet.

In FIGS. 25A, 25B, and 25C, the case where the second terminal device 200E performs the resource reselection has been described, but the second terminal device 200E may adjust the transmission parameter instead of the resource reselection. A case where the transmission parameters are adjusted will be described with reference to FIGS. 26A, 26B, and 26C.

Figure 26A:
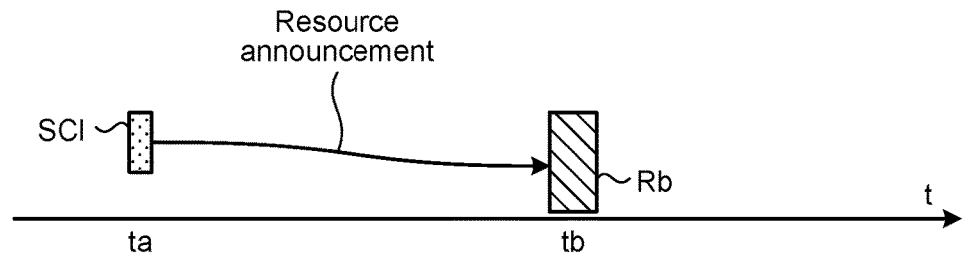
FIGS. 26A, 26B, and 26C are diagrams for explaining another example of packet transmission processing of the second terminal device according to the present embodiment.
Figure 26B:
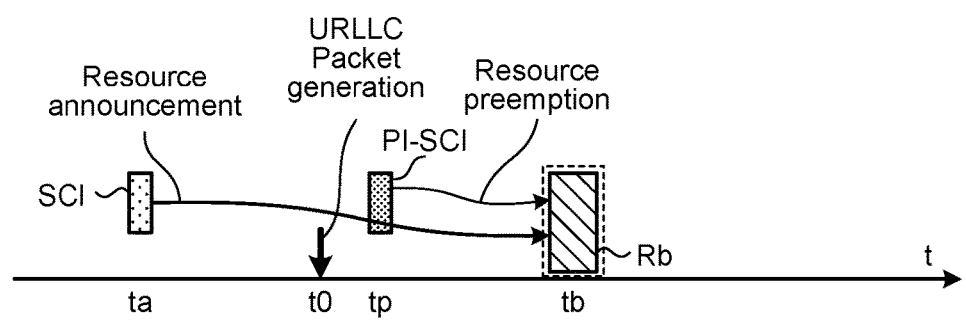
Figure 26C:
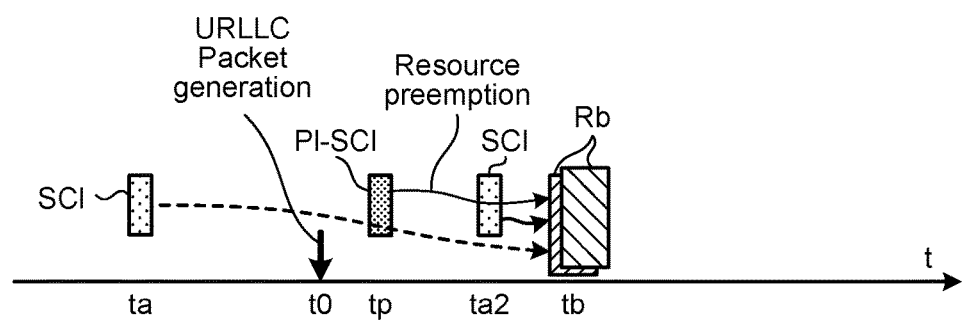

FIGS. 26A, 26B, and 26C are diagrams for describing another example of the packet transmission processing of the second terminal device 200E according to the present embodiment. Note that FIGS. 26A and 26B are the same as FIGS. 25A and 25B, and thus description thereof is omitted.

Upon detecting the PI-SCI transmitted at time tp, the second terminal device 200E adjusts the transmission parameter of the data packet, for example. As illustrated in FIG. 26C, the second terminal device 200E includes the information regarding the adjusted transmission parameter in the SCI and transmits the SCI at time ta2. Thereafter, the second terminal device 200E transmits the data packet using the resource Rb at time tb. Note that, at time tb, the first terminal device 200P also transmits the URLLC packet using the resource Rb, but since the second terminal device 200E adjusts the transmission parameters, it is possible to avoid a collision between the two packets.

Note that, in FIG. 26C, the transmission resource of the URLLC packet and the transmission resource of the data packet are illustrated to be shifted for ease of viewing, but the transmission resource of the URLLC packet and the transmission resource of the data packet may completely coincide with each other. Alternatively, a transmission resource of the URLLC packet and a part of a transmission resource of the data packet may overlap.

A case where the second terminal device 200E performs resource reselection and adjustment of a transmission parameter has been described here, but the second terminal device 200E may stop transmission of a data packet.

(Case where PI-SCI and SCI are Simultaneously Transmitted)

Figure 27:
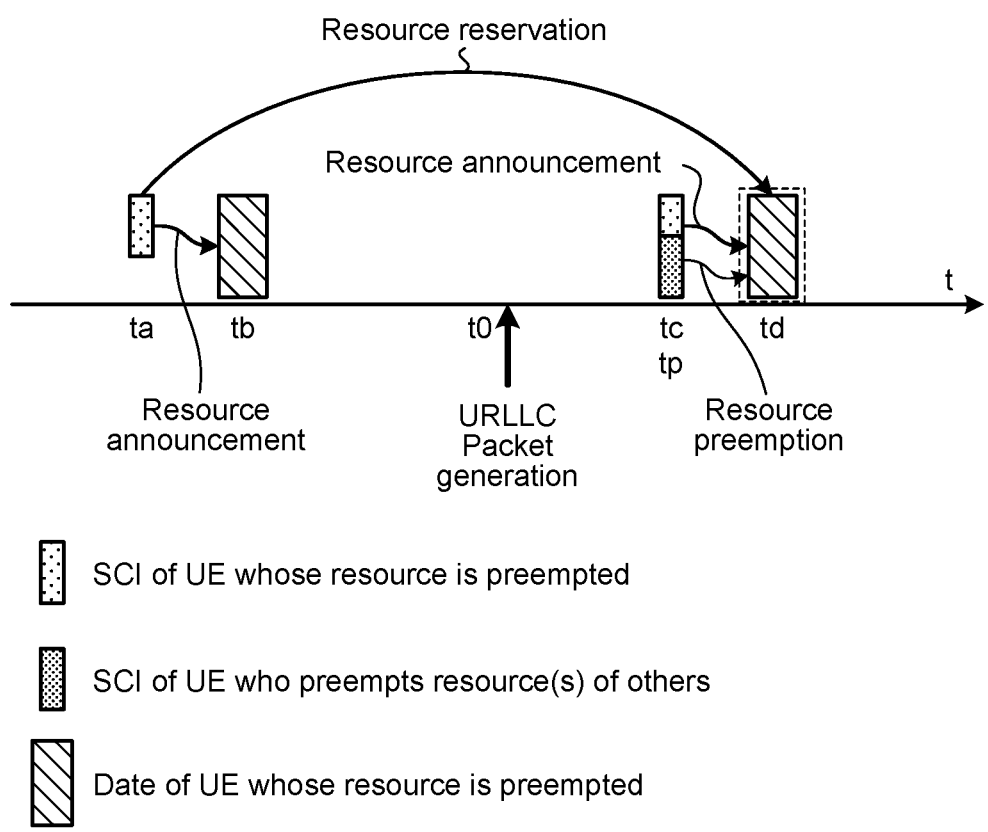
FIG. 27 is a diagram for explaining another example of packet transmission processing of the second terminal device according to the present embodiment.

For example, transmission of PI-SCI by the first terminal device 200P and transmission of SCI by the second terminal device 200E may overlap with each other. Such a case will be described with reference to FIG. 27. FIG. 27 is a diagram for describing another example of the packet transmission processing of the second terminal device 200E according to the present embodiment.

As illustrated in FIG. 27, it is assumed that time tp at which the first terminal device 200P transmits the PI-SCI and time tc at which the second terminal device 200E transmits the SCI are the same time. This occurs, for example, in a case where the first terminal device 200P can perform only one of transmission and reception (Half Duplex) and cannot receive a message indicating the SCI of the second terminal device 200E, and the transmission timings of the PI-SCI and the SCI overlap with each other. In this case, the second terminal device 200E cannot detect the PI-SCI.

In this case, for example, another terminal device 200 (not illustrated) that has received both the PI-SCI and the SCI notifies the second terminal device 200E of the preemption by the first terminal device 200P. Examples of the other terminal device 200 include a terminal device 200 that performs sidelink communication with the first terminal device 200P and a terminal device 200 that performs sidelink communication with the second terminal device 200E. The terminal device 200 is a terminal device 200 that transmits/receives data and transmits/receives feedback and assistance information to/from the first terminal device 200P or the second terminal device 200E.

Alternatively, the base station 100 may notify the second terminal device 200E of the preemption instead of the other terminal device 200. A terminal device 200 or the like having a part of the functions of the base station 100, such as a road site unit (RSU) or a master UE that allocates a resource pool to the first terminal device 200P or the second terminal device 200E, may notify the preemption.

Note that, since the SCI and the PI-SCI are small in size, there is a low possibility of collision even if they are transmitted at the same time. Therefore, the other terminal device 200, the base station 100, and the like can receive both the SCI and the PI-SCI transmitted at the same time.

The second terminal device 200E that has received the notification of the preemption from another device such as another terminal device 200, the base station 100, or the master UE transmits a packet by performing resource reselection and the like similarly to the case of receiving the PI-SCI after the SCI transmission.

(Processing procedure of packet transmission processing)

Figure 28:
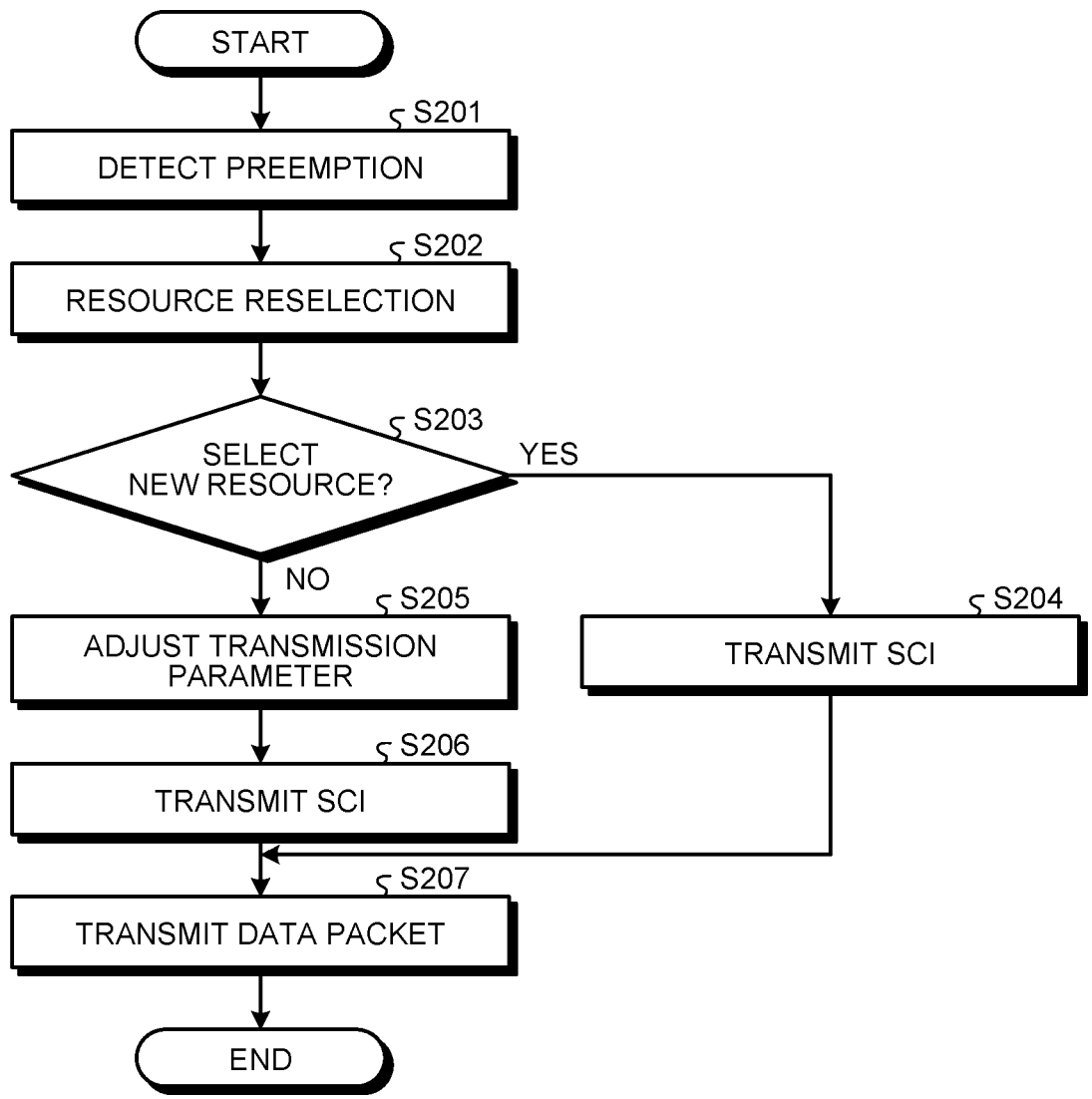
FIG. 28 is a flowchart for explaining an example of packet transmission processing according to the present embodiment.

Here, the processing procedure of the packet transmission processing described with reference to FIGS. 24A, 24B, 24C, 25A, 25B, 25C, 26A, 26B, 26C, and 27 will be described with reference to FIG. 28. FIG. 28 is a flowchart for describing an example of packet transmission processing according to the present embodiment.

First, the second terminal device 200E detects preemption by the first terminal device 200P by detecting the PI-SCI (step S201). For example, when the timing at which the second terminal device 200E transmits the SCI and the timing at which the first terminal device 200P transmits the PI-SCI are the same, the second terminal device 200E cannot detect the PI-SCI. In this case, the second terminal device 200E detects preemption by the first terminal device 200P by receiving a notification of preemption by the first terminal device 200P from another device.

Next, the second terminal device 200E performs reselection of resources (step S202). In a case where a new resource can be selected by reselection (step S203; Yes), the second terminal device 200E transmits the SCI that announces packet transmission with the new resource (step S204).

On the other hand, in a case where the new resource cannot be selected (step S203; No), the second terminal device 200E adjusts the transmission parameter (step S205), and transmits the SCI for announcing packet transmission with the adjusted transmission parameter (step S206).

The second terminal device 200E that has transmitted the SCI in step S204 or step S206 transmits the data packet according to the announcement by the SCI (step S207).

(Case where Resource for Feedback Transmission is Preempted)

In the above example, the case where the resource for data transmission is preempted has been described, but the preemption target is not limited to the resource for data transmission. For example, resources for feedback transmission may also be preempted by the first terminal device 200P.

Therefore, the feedback transmission processing by the second terminal device 200E in a case where a resource for feedback transmission is preempted by the first terminal device 200P will be described below.

Figure 29A:
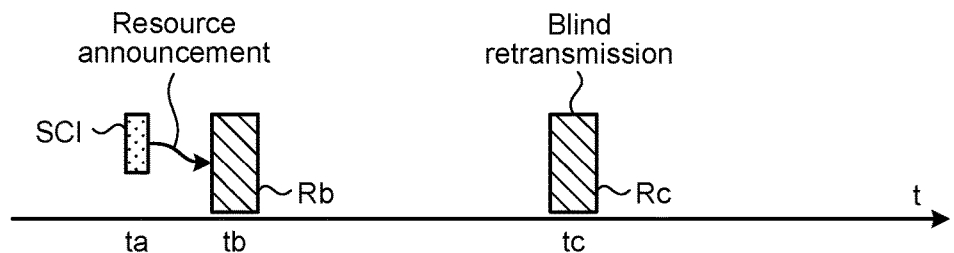
FIGS. 29A, 29B, and 29C are diagrams for explaining an example of feedback transmission processing by the second terminal device according to the present embodiment.
Figure 29B:
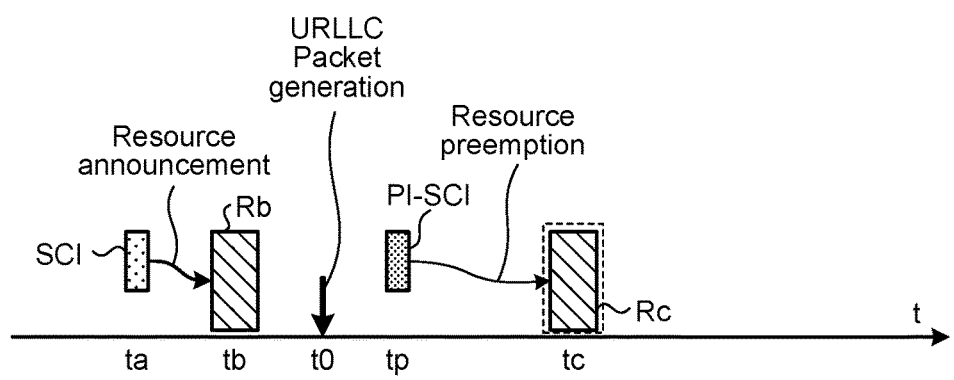
Figure 29C:
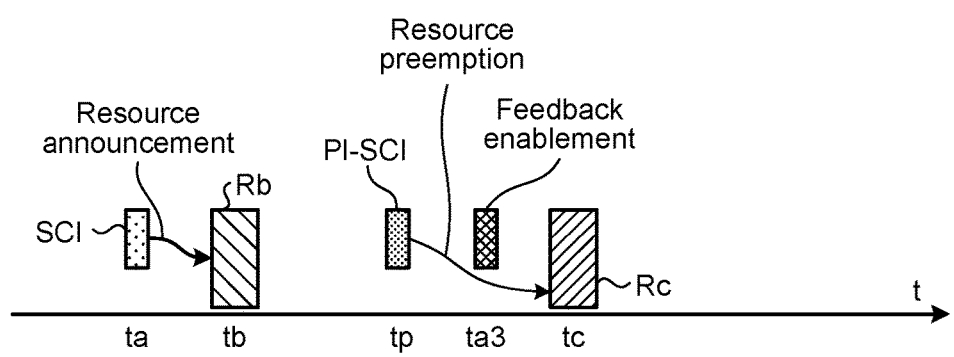

(Case where resource for blind retransmission is preempted) First, the feedback transmission processing in a case where resources for blind retransmission are preempted will be described with reference to FIGS. 29A, 29B, and 29C. FIGS. 29A, 29B, and 29C are diagrams for describing an example of feedback transmission processing by the second terminal device 200E according to the present embodiment.

FIG. 29A illustrates an example of transmission of blind retransmission by the second terminal device 200E (UE2) in a case where preemption is not performed by the first terminal device 200P (UE1).

The second terminal device 200E transmits the SCI at time ta, for example, and performs an announcement of resources at time tb. Subsequently, the second terminal device 200E transmits a data packet at time tb, and transmits blind retransmission using the resource Rc at time tc. The resource Rc is a resource for blind retransmission.

At this time, as illustrated in FIG. 29B, it is assumed that the first terminal device 200P detects generation of a URLLC packet at time t0. In this case, the first terminal device 200P performs resource preemption of the resource Rc by transmitting the PI-SCI at time tp.

At this time, when the second terminal device 200E transmits the blind retransmission on the resource Rc, a data packet (in this example, the URLLC packet) transmitted by the first terminal device 200P and the blind retransmission transmitted by the second terminal device 200E collide with each other.

Therefore, upon detecting the PI-SCI transmitted at time tp, the second terminal device 200E switches the type (method) of the feedback (retransmission), for example. For example, in FIGS. 29A, 29B, and 29C, the second terminal device 200E switches the type of feedback from blind retransmission to retransmission based on HARQ feedback. In a case of switching to the HARQ feedback, as illustrated in FIG. 29C, the second terminal device 200E enables the HARQ feedback by notifying the Feedback enablement at time ta3.

As a result, the second terminal device 200E can perform feedback even when the resource for feedback transmission is preempted.

(Case where HARQ Feedback Channel is Preempted)

In the above example, the case where the resource for blind retransmission is preempted has been described, but the resource for feedback transmission to be preempted is not limited to the resource for blind retransmission. For example, in a case where the second terminal device 200E performs HARQ feedback, if the resource of the feedback channel is preempted, the second terminal device 200E cannot transmit and receive the PSFCH.

In this case, the second terminal device 200E switches from the HARQ feedback to the blind retransmission. This point will be described with reference to FIGS. 30A, 30B, and 30C. FIGS. 30A, 30B, and 30C are diagrams for describing another example of the feedback transmission processing by the second terminal device 200E according to the present embodiment.

FIG. 30A illustrates an example of PSFCH transmission by the second terminal device 200E (UE2) in a case where preemption is not performed by the first terminal device 200P (UE1).

The second terminal device 200E transmits the SCI at time ta, for example, and performs an announcement of resources at time tb. Subsequently, the second terminal device 200E transmits the data packet at time tb, and transmits the PSFCH using the resource Rc at time tc. The resource Rc is a resource of the feedback channel.

At this time, as illustrated in FIG. 30B, it is assumed that the first terminal device 200P detects generation of a URLLC packet at time to. In this case, the first terminal device 200P performs resource preemption of the resource Rc by transmitting the PI-SCI at time tp.

At this time, when the second terminal device 200E transmits the PSFCH on the resource Rc, a data packet (in this example, the URLLC packet) transmitted by the first terminal device 200P and the PSFCH transmitted by the second terminal device 200E collide with each other.

Therefore, upon detecting the PI-SCI transmitted at time tp, the second terminal device 200E switches the type of feedback (retransmission), for example. For example, in FIGS. 30A, 30B, and 30C, the second terminal device 200E switches the type of feedback from retransmission based on HARQ feedback to blind retransmission.

In a case where the transmission type is switched to the blind retransmission, as illustrated in FIG. 30C, the second terminal device 200E disables the HARQ feedback by notifying the feedback disablement at time ta3. The second terminal device 200E transmits blind retransmission at time td after time ta3.

As a result, the second terminal device 200E can perform feedback even when the resource for feedback transmission is preempted.

Note that, here, the type of feedback is switched in a case where the resource of the feedback channel is preempted, but the present invention is not limited thereto. For example, in a case where transmission of the HARQ feedback is necessary, the second terminal device 200E may transmit the feedback on the PSSCH. As described above, when the PSFCH cannot be transmitted, the second terminal device 200E may transmit the information to be transmitted on the PSFCH on the PSSCH.

As described above, the wireless communication device (second terminal device 200E) according to the present embodiment includes the control unit 240E that adjusts the transmission parameters and transmits a packet in a case where a resource selected for use in packet transmission is preempted by another wireless communication device (first terminal device 200P) in sidelink communication.

As a result, it is possible to reduce collision of packets transmitted in the sidelink.

The wireless communication device (first terminal device 200P) according to the present embodiment includes the control unit 240P that, in a case where the priority of the transmission packet is higher than the priority of the packet transmitted by another wireless communication device (second terminal device 200E) in the sidelink communication, preempts the resource selected by the other wireless communication device for use in packet transmission and transmits the transmission packet.

As a result, it is possible to reduce collision of packets transmitted in the sidelink.

5. MODIFICATION

5.1. Modification 1

In the embodiment described above, the first terminal device 200P can preempt the resource of the second terminal device 200E that transmits a packet with low priority. Therefore, there is a possibility that the resource of the second terminal device 200E that transmits a packet with low priority is always preempted, and in this case, the second terminal device 200E cannot transmit a packet with low priority. In this way, implementing the resource preemption causes a fairness problem of sidelink communication.

Therefore, in Modification 1 according to the present embodiment, in order to solve such a fairness problem, for example, the second terminal device 200E changes the priority according to the number of times of preemption. Hereinafter, it is assumed that the terminal device 200 controls the priority (QoS) of the transmission packet using ProSe per-packet priority (PPPP). The terminal device 200 includes priority information associated with PPPP in sidelink control information (SCI) at the time of sidelink packet transmission. This enables priority control between terminals.

Specifically, upon detecting preemption from the first terminal device 200P, the control unit 240E of the second terminal device 200E counts the number of times of preemption.

The second terminal device 200E adjusts the priority of packet transmission when the counted number of times of preemption becomes equal to or larger than a predetermined threshold. For example, in a case where the number of times of preemption becomes a predetermined threshold value or more, the control unit 240E of the second terminal device 200E sets PPPP to have the highest priority. Alternatively, the second terminal device 200E may set the PPPP to be one level higher than the current setting.

For example, in LTE V2X, the value of PPPP is set in eight steps from "0" having the highest priority to "7" having the lowest priority. For example, it is assumed that PPPP of the second terminal device 200E is set to "5". In this case, when the resource of the second terminal device 200E is preempted k+1 times and becomes k times or more of the predetermined threshold value, the second terminal device 200E changes the PPPP from "5" that has been set so far to, for example, "0".

As a result, the second terminal device 200E is not preempted from the other terminal devices 200 more than k times, and can transmit a packet even in an environment where resource preemption is performed.

Note that the second terminal device 200E may change the PPPP from "5" to "4" when the number of times of preemption becomes equal to or larger than the predetermined threshold value k. As described above, the second terminal device 200E sets the priority to be high, so that it is difficult to be preempted a predetermined number of times or more.

When the second terminal device 200E successfully transmits the packet after changing the priority to be high, the second terminal device 200E returns the changed priority to the original. Alternatively, the priority level is set to be lower than the original priority level. For example, as described above, it is assumed that the second terminal device 200E originally having the PPPP of "5" has changed the PPPP to "0" and has successfully transmitted the packet since the resources have been preempted k times or more. In this case, the second terminal device 200E returns PPPP from "0" to "5". Alternatively, the second terminal device 200E sets PPPP from "0" to "6" having a lower priority than the original "5".

As a result, the second terminal device 200E can transmit a packet without maintaining a state where the priority is higher than necessary. Note that, in a case where the second terminal device 200E sets the PPPP to for example, "6" lower than the original "5", the PPPP may be returned to the original "5" after a predetermined period elapses or after a predetermined number of packets are transmitted.

Note that the predetermined threshold k described above may be notified by the base station 100 using RRC or DCI, for example. The predetermined threshold k may be set for each cell, or may be set for each resource pool, or may be set for each QoS Level-Specific.

Note that, here, the second terminal device 200E adjusts the priority according to the number of times of preemption, but the present invention is not limited thereto. For example, in a case where the second terminal device 200E is preempted k times or more, preemption may be prohibited (stopped) for the surrounding terminal devices 200. The second terminal device 200E that has been preempted k times or more notifies the surrounding terminal devices 200 of the preemption prohibition, thereby preventing the resource from being preempted any more. The second terminal device 200E notifies the surrounding terminal devices 200 of the prohibition of the preemption by transmitting information that prohibits the preemption to the PSCCH, the PSSCH, or the PSFCH, for example. The first terminal device 200P that has received the notification of preemption prohibition does not preempt the resource of the second terminal device 200E that has transmitted the notification, but preempts the resource of another second terminal device 200E.

In this way, since the second terminal device 200E prohibits the preemption, it is possible to secure an opportunity of packet transmission of the second terminal device 200E.

The first terminal device 200P may control the number of times of preemption. For example, it is determined whether the first terminal device 200P performs preemption according to the use status of resources. More specifically, for example, the first terminal device 200P performs preemption in a case where a channel occupancy ratio (CR) is less than a predetermined threshold m, and does not perform preemption in a case where the channel occupancy ratio is equal to or greater than the predetermined threshold m. Note that CR is a parameter indicating a ratio of resources used or scheduled to be used by the subject device in a certain period of time.

In this manner, the first terminal device 200P determines whether to perform preemption in accordance with the use status of resources, whereby it becomes difficult for the first terminal device 200P to use the resources exclusively, and the terminal device 200 can use the resources fairly.

Note that the predetermined threshold m described above may be notified by the base station 100 using RRC or DCI, for example. The predetermined threshold m may be set for each cell, or may be set for each resource pool, or may be set for each QoS Level-Specific.

The first terminal device 200P randomly selects a resource to be preempted when selecting a resource to be preempted from a resource with low priority. For example, when a resource with the lowest priority is selected as a resource to be preempted, the second terminal device 200E with the lowest priority is more likely to be preempted and to be unable to transmit a packet. Therefore, the first terminal device 200P randomly selects a resource to be preempted. As a result, the second terminal device 200E to be preempted can be made less biased.

Alternatively, the number of times the first terminal device 200P has performed preemption may be counted, and in a case where the first terminal device 200P has performed preemption a predetermined threshold n times or more, the preemption may be stopped for a certain period of time, for example. At this time, the first terminal device 200P may count the number of times of preemption for each of the preempted second terminal devices 200E, and stop the preemption of the second terminal device 200E whose count number is equal to or larger than the predetermined threshold n.

In other words, the first terminal device 200P counts the number of times of preemption for each of the plurality of second terminal devices 200E. The first terminal device 200P selects a resource selected by the second terminal device 200E whose number of times of preemption is less than the predetermined threshold n as a resource to be preempted.

Note that the predetermined threshold n described above may be notified by the base station 100 using RRC or DCI, for example. The predetermined threshold n may be set for each cell, or may be set for each resource pool, or may be set for each QoS Level-Specific.

5.2. Modification 2

In the embodiment described above, method B is adopted in which both the first terminal device 200P that preempts a resource and the second terminal device 200E to be preempted perform sensing by the terminal device 200 itself and select a sidelink resource. However, the first terminal device 200P and the second terminal device 200E may adopt a resource allocation method other than method B.

Examples of the resource allocation method other than method B include method A in which the base station 100 described above allocates sidelink resources. In the NR, in addition to the above-described methods A and B, there is a method (hereinafter, referred to as method C) in which, for example, a master terminal or the like allocates a sidelink resource instead of the base station 100.

In the discussion of 3GPP so far, the terminal device 200 of method B (mode 2 of NR) that selects the resource of the sidelink transmission by itself performs resource preemption. Then, the terminal device 200 also transmits information regarding resource preemption such as PI-SCI on the sidelink channel. However, there is a case where the terminal device 200 that performs sidelink communication according to method A or method C described above is mixed with the terminal device 200 that performs sidelink communication according to method B. How to perform preemption in such a case will be described. Note that the case where method A and method B are mixed and the case where method B and method C are mixed are different in whether the subject that performs resource allocation is the base station 100 or a third device, but the other operations and the like are the same. Therefore, a case where method A and method B are mixed will be described below. In the following description, it is assumed that the first terminal device 200P that performs preemption performs resource selection on the basis of method B.

In this case, for example, it is assumed that the first terminal device 200P does not preempt the resource of the terminal device 200 of method A. In other words, the first terminal device 200P preempts the resource of the terminal device 200 of, for example, method B other than method A.

For example, in LTE V2X, the value of a resource reservation field is different between method A (LTE mode 3) and method B (LTE mode 4). For example, in the case of method A, the value of the resource reservation field is "0".

On the other hand, in method B, the value of the resource reservation field is a value corresponding to the interval of reservation. Therefore, the first terminal device 200P can determine the method of the terminal device 200 using the resource according to whether the value of the resource reservation field is "0" or other values, and can prevent the resource of the terminal device 200 of method A from being preempted.

However, in a case where the terminal device 200 of method B does not perform resource reservation, the value of the resource reservation field is "0", and thus, it cannot be distinguished from the terminal device 200 of method A.

In this case, for example, the first terminal device 200P preempts the resource of the terminal device 200 of which the value of the resource reservation field is not "0". As a result, the resource of the terminal device 200 of method B that does not perform resource reservation cannot be preempted, but the resource of the terminal device 200 of method B that performs resource reservation can be preempted. Resources of the terminal device 200 of method A are not preempted. In this manner, the first terminal device 200P performs resource preemption according to the value of the resource reservation field, so that the resource of the terminal device 200 of method A can be excluded from the target of the preemption.

Alternatively, for example, the information regarding the method may be included in the SCI transmitted by the terminal device 200. As a result, when the first terminal device 200P preempts the resource, it is possible to confirm the resource allocation method of the terminal device 200 to be preempted. In this case, regardless of whether resource reservation is performed, the first terminal device 200P can preempt the resource of the terminal device 200 of method B.

Note that, as described above, in a case where resource preemption of the terminal device 200 of method A is not performed, the first terminal device 200P confirms the method of the second terminal device 200E that uses a resource to be preempted when selecting the resource. The other processes related to preemption are the same as the processes described in the above-described embodiments.

Figure 31:
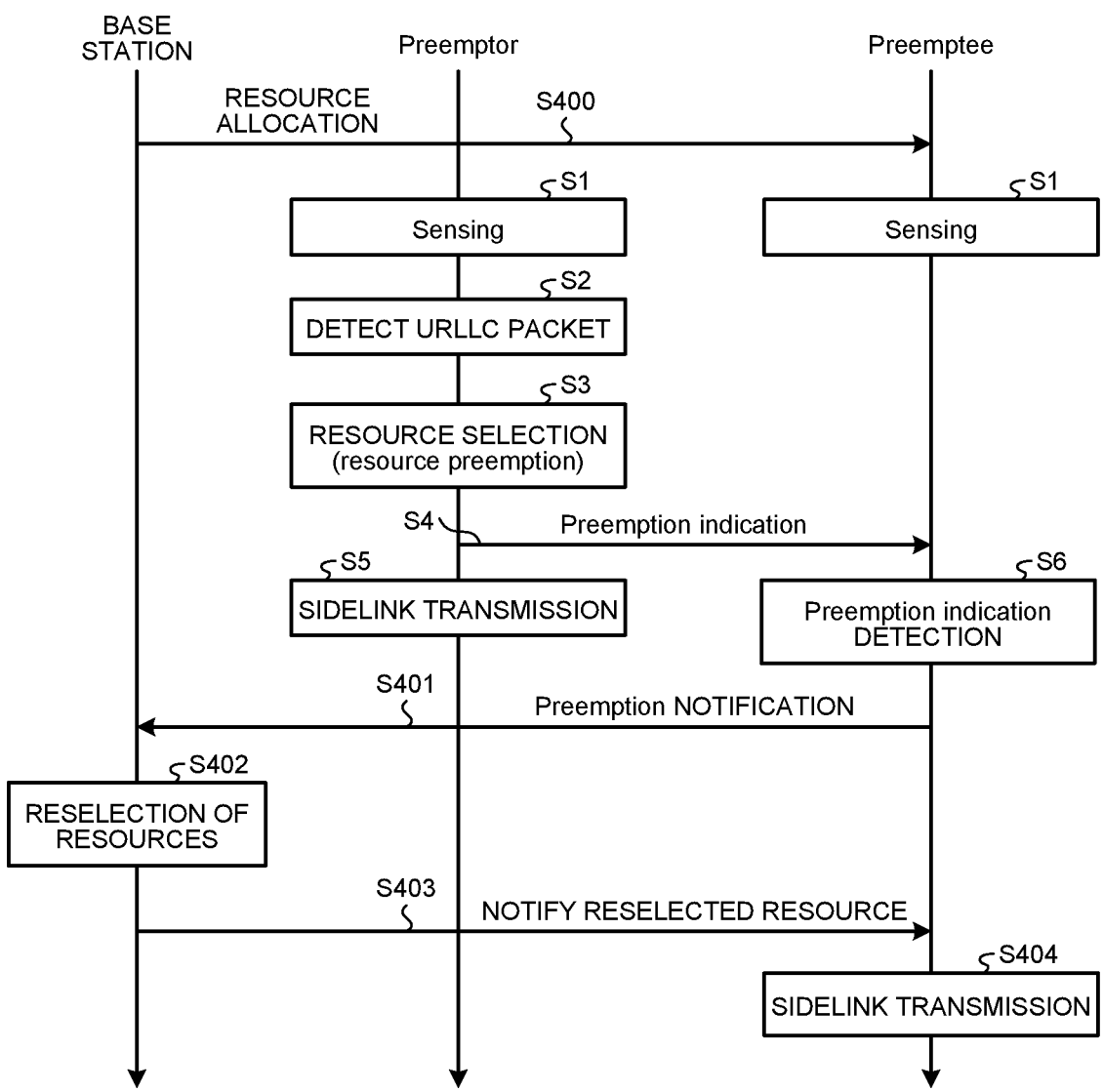
FIG. 31 is a diagram for explaining preemption by a terminal device according to Modification 2 of the present embodiment.

In the example described above, the resources of the terminal device 200 of method A are not preempted, but the resources of the terminal device 200 of method A may be preempted. Such a case will be described with reference to FIG. 31. FIG. 31 is a diagram for explaining preemption by the terminal device 200 according to Modification 2 of the present embodiment.

In the sequence diagram illustrated in FIG. 31, the processing until the second terminal device 200E (preemptee) detects preemption after the base station 100 allocates the resource pool to the terminal device 200 is the same as the sequence diagram illustrated in FIG. 19. Therefore, the same processes as those in FIG. 19 are denoted by the same reference numerals, and description thereof is omitted.

As illustrated in FIG. 31, first, the base station 100 allocates a resource for data packet transmission to the second terminal device 200E (step S400). Thereafter, upon detecting the preemption indication, the second terminal device 200E notifies the base station 100 of the preemption (step S401). Such notification is performed using, for example, a PUCCH or a PUSCH. Such notification includes information indicating that the resource allocated from the base station 100 has been preempted, information regarding the preempted resource, for example, information regarding the preempted second terminal device 200E such as the ID of the second terminal device 200E, and the like.

Upon receiving the notification, the base station 100 reselects the resource (step S402), and notifies the reselected resource to the second terminal device 200E (step S403). The second terminal device 200E performs sidelink transmission using the notified reselection resource (step S404).

As a result, the first terminal device 200P can execute resource preemption regardless of the resource allocation method of the terminal device 200.

Note that, here, the base station 100 is notified that the second terminal device 200E has been preempted, but for example, the base station 100 may be notified that the first terminal device 200P has preempted a resource. In this case, the first terminal device 200P sends the notification using the PUCCH or the PUSCH similarly to the second terminal device 200E. The notification contents are also similar to those of the second terminal device 200E.

Alternatively, the second terminal device 200E may not notify the base station 100 of the preemption and adjust the transmission parameter so as to perform sidelink communication with the preempted resource. The base station 100 may instruct the second terminal device 200E to adjust the transmission parameter without reselecting the resource. The base station 100 can perform reselection of resources, adjustment of transmission parameters, switching of the type of feedback, adjustment of the maximum number of times of retransmission, and the like in the same manner as the second terminal device 200E in the above-described embodiment.

In the reselection of the resource, for example, the PSSCH transmission resource or the PSFCH transmission resource is reselected. Since measurement is required to adjust the transmission parameters, in a case where the second terminal device 200E adjusts the transmission parameters, after evaluating the SCI, the data, and the SL-RSRP of the first terminal device 200P, the transmission parameters such as the transmission power and the MCS are adjusted on the basis of the evaluation result. In a case where the base station 100 adjusts the transmission parameters, the second terminal device 200E notifies the base station 100 of the measurement result. Alternatively, the base station 10 may be notified of the evaluation result of measurement.

Note that reselection of resources and adjustment of transmission parameters may be performed by either the second terminal device 200E or the base station 100, or may be performed by both of them.

The second terminal device 200E may switch the resource allocation method from method A to method B and notify the base station 100 of the switching, instead of notifying of the preemption in step S401. In this case, the operation of the second terminal device 200E after the method is switched is the same as that in the above-described embodiment, and thus the description thereof is omitted.

Note that, in a case where the first terminal device 200P performs resource allocation on the basis of method A and detects a URLLC packet, the first terminal device 200P selects a resource by its subject device and transmits the URLLC packet without waiting for resource allocation from the base station 100. As a result, the first terminal device 200P can transmit the URLLC packet with a low latency. Note that processing related to preemption in this case is the same as that in the above-described embodiment, and thus description thereof is omitted.

6. SUMMARY

As described above, according to the present embodiment and the modification, there is provided a mechanism capable of reducing collision of packets transmitted in the sidelink.

The first terminal device 200P illustrated in FIG. 21 can function as an example of the wireless communication device of the present disclosure. The control unit 240P can function as a control unit of the wireless communication device of the present disclosure. The second terminal device 200E illustrated in FIG. 22 can function as an example of the wireless communication device of the present disclosure. The control unit 240E can function as a control unit of the wireless communication device of the present disclosure. The terminal device 200 may be a device provided in a moving object. The moving object may be a vehicle.

Each step in the processing executed by each device in the present specification does not necessarily need to be processed in time series according to the order described as a sequence diagram or a flowchart. For example, each step in the processing executed by each device may be processed in an order different from the order described as the flowchart, or may be processed in parallel.

It is also possible to create a computer program for causing hardware such as a CPU, a ROM, and a RAM built in each device to exhibit a function equivalent to the configuration of each device described above. A storage medium storing the computer program can also be provided. By configuring each functional block illustrated in the functional block diagram by hardware, a series of processing can be realized by hardware.

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

The effects described in the present specification are merely illustrative or exemplary, and are not restrictive. That is, the technology according to the present disclosure can exhibit other effects obvious to those skilled in the art from the description of the present specification together with or instead of the above effects.

Note that the present technology can also have the following configurations.

(1)

A wireless communication device comprising:
 a control unit configured to adjust a transmission parameter and transmit a packet in a case where a resource selected for use in packet transmission is preempted by another wireless communication device in sidelink communication.

(2)

The wireless communication device according to (1), wherein the adjustment of the transmission parameter includes at least one of lowering transmission power and switching at least one of a modulation method and a coding method to a high-efficiency method.

(3)

The wireless communication device according to (1) or (2), wherein the selected resource is a resource that requests the use of a radio wave to transmit a data packet.

(4)

The wireless communication device according to (1) or (2), wherein the selected resource is a resource reserved in advance for transmitting a data packet.

(5)
The wireless communication device according to any one of (1) to (4), wherein
the control unit is configured to:
adjust the transmission parameter if the selected resource is preempted after transmitting the information regarding the transmission parameter for transmitting the packet; and
transmit information on the adjusted transmission parameter.

(6)
The wireless communication device according to (1), wherein the selected resource is a resource selected for transmitting information related to feedback of packet transmission.

(7)
The wireless communication device according to (6), wherein
the control unit is configured to:
change a method of the feedback if the resource selected for transmitting the information regarding the feedback is preempted.

(8)
The wireless communication device according to (1), wherein
the control unit is configured to:
adjust the transmission parameter in a case where a notification indicating that the selected resource is preempted is received from a third wireless communication device different from the other wireless communication devices.

(9)
The wireless communication device according to any one of (1) to (8), wherein the control unit adjusts a priority of the packet in a case where the number of times of preemption becomes equal to or greater than a predetermined threshold value.

(10)
The wireless communication device according to any one of (1) to (8), wherein the control unit gives a notification of stop of preemption in a case where the number of times of preemption becomes a predetermined threshold value or more.

(11)
The wireless communication device according to any one of (1) to (9), wherein the control unit adjusts at least one of transmission power, an MCS, and a packet size as the transmission parameter.

(12)
The wireless communication device according to any one of (1) to (11), wherein the control unit adjusts the transmission parameter by reselecting a resource for transmitting the packet.

(13)
A wireless communication device comprising:
a control unit configured to preempt a resource selected by another wireless communication device for use in packet transmission and transmit a transmission packet in a case where a priority of the transmission packet is higher than a priority of a packet transmitted by the other wireless communication devices in sidelink communication.

(14)
The wireless communication device according to (13), wherein
the control unit is configured to:
count the number of times of preemption for each of the other wireless communication devices, and
select, as the resource to be preempted, a resource selected by the other wireless communication device in which the number of times of preemption is less than a predetermined number of times.

(15)
The wireless communication device according to (13) or (14), wherein
the control unit is configured to:
randomly select the resource to be preempted from a plurality of the resources selected by at least one of the other wireless communication devices.

(16)
The wireless communication device according to any one of (13) to (15), wherein the transmission packet is a packet transmitted in a URLLC (Ultra reliable and low latency communications) use case.

(17)
A wireless communication method, comprising:
adjusting a transmission parameter in a case where a resource selected for use in packet transmission is preempted by another wireless communication device in sidelink communication, and transmitting the packet using the selected resource.

(18)
A wireless communication method, comprising:
preempting a resource selected for use in transmitting a packet by another wireless communication device to transmit a transmission packet when a priority of the transmission packet is higher than a priority of the packet to be transmitted by the other wireless communication device in sidelink communication.

REFERENCE SIGNS LIST

1 SYSTEM
11 CELL
20 CORE NETWORK
30 PDN
100 BASE STATION
200 TERMINAL DEVICE
210 ANTENNA UNIT
220 WIRELESS COMMUNICATION UNIT
230 STORAGE UNIT
240 CONTROL UNIT

The invention claimed is:

1. A first wireless communication device, comprising:
circuitry configured to:
adjust a transmission parameter based on a determination that a first resource selected for packet transmission is preempted by a second wireless communication device in sidelink communication, wherein the adjustment of the transmission parameter includes conversion of a modulation method to a high-efficiency method; and
transmit the packet using the selected first resource.

2. The first wireless communication device according to claim 1, wherein the adjustment of the transmission parameter includes at least one of reduction of transmission power and conversion of a coding method to a high-efficiency method.

3. The first wireless communication device according to claim 1, wherein the selected first resource uses a radio wave to transmit the packet.

4. The first wireless communication device according to claim 1, wherein the selected first resource is reserved in advance for the transmission of the packet.

5. The first wireless communication device according to claim 1, wherein
the circuitry is further configured to:
adjust the transmission parameter based on a determination that the selected first resource is preempted after transmission of information regarding the transmission parameter for the transmission of the packet; and
transmit the information based on the adjusted transmission parameter.

6. The first wireless communication device according to claim 1, wherein the selected first resource is configured to transmit information related to feedback of the packet transmission.

7. The first wireless communication device according to claim 6, wherein
the circuitry is further configured to
change a method of the feedback based on a determination that the selected first resource for the transmission of the information regarding the feedback is preempted.

8. The first wireless communication device according to claim 1, wherein
the circuitry is further configured to adjust the transmission parameter based on a determination that a notification, indicating the selected first resource is preempted, is received from a third wireless communication device different from the second wireless communication device.

9. The first wireless communication device according to claim 1, wherein the circuitry is further configured to adjust a priority of the packet based on a determination that a number of times of preemption is equal to or more than a specific threshold value.

10. The first wireless communication device according to claim 1, wherein the circuitry is further configured to transmit a notification of stop of preemption based on a determination that a number of times of preemption becomes equal to or more than a specific threshold value.

11. The first wireless communication device according to claim 1, wherein the circuitry is further configured to adjust at least one of transmission power, Modulation and Coding Scheme (MCS), and a packet size as the transmission parameter.

12. The first wireless communication device according to claim 11, wherein the circuitry is further configured to adjust the transmission parameter based on reselection of a second resource for the transmission of the packet.

13. A first wireless communication device, comprising:
circuitry configured to:
preempt a resource selected by a second wireless communication device of a plurality of wireless communication devices for packet transmission;
transmit a first transmission packet based on a determination that a first priority of the first transmission packet is higher than a second priority of a second packet transmitted by the second wireless communication device in sidelink communication; and
receive a notification to stop the preemption, from the second wireless communication device, based on a determination that a number of times of preemption is equal to or more than a specific threshold value.

14. The first wireless communication device according to claim 13, wherein
the circuitry is further configured to:
count the number of times of preemption for each of the plurality of wireless communication devices, and
select, as the resource to be preempted, the resource selected by the second wireless communication device in which the number of times of preemption is less than a specific number of times.

15. The second wireless communication device according to claim 13, wherein the circuitry is further configured to randomly select the resource to be preempted from a plurality of the resources selected by at least one of the plurality of wireless communication devices.

16. The second wireless communication device according to claim 13, wherein the first transmission packet is transmitted in a URLLC (Ultra reliable and low latency communications) use case.

17. A first wireless communication method, comprising:
adjusting a transmission parameter based on a determination that a resource selected for packet transmission is preempted by a second wireless communication device in sidelink communication, wherein
the adjustment of the transmission parameter includes conversion of a modulation method to a high-efficiency method; and
transmitting the packet using the selected resource.

18. A first wireless communication method, comprising:
preempting a resource selected for transmission of a first transmission packet by a second wireless communication device;
transmitting the first transmission packet based on a determination that a first priority of the first transmission packet is higher than a second priority of a second packet transmitted by the second wireless communication device in sidelink communication; and
receiving a notification to stop the preemption, from the second wireless communication device, based on a determination that a number of times of preemption is equal to or more than a specific threshold value.

* * * * *